US007690906B2

(12) United States Patent
Tado et al.

(10) Patent No.: US 7,690,906 B2
(45) Date of Patent: Apr. 6, 2010

(54) ROTARY POWDER COMPRESSION MOLDING MACHINE

(75) Inventors: Yutaka Tado, Amagasaki (JP); Takayuki Tsukada, Amagasaki (JP); Shinya Kako, Amagasaki (JP); Yoshitsugu Oneda, Omihachiman (JP); Makoto Kubota, Kyoto (JP); Tomohiro Kakitani, Kyoto (JP)

(73) Assignee: Kikusui Seisakusho Ltd., Kyoto-shi (JP)

( * ) Notice: Subject to any disclaimer, the term of this patent is extended or adjusted under 35 U.S.C. 154(b) by 526 days.

(21) Appl. No.: 11/596,535

(22) PCT Filed: May 18, 2004

(86) PCT No.: PCT/JP2004/007067

§ 371 (c)(1),
(2), (4) Date: Nov. 15, 2006

(87) PCT Pub. No.: WO2005/110726

PCT Pub. Date: Nov. 24, 2005

(65) Prior Publication Data

US 2008/0258343 A1 Oct. 23, 2008

(51) Int. Cl.
*B29C 33/60* (2006.01)
*B29C 43/28* (2006.01)

(52) U.S. Cl. ........................ 425/107; 425/218; 425/345

(58) Field of Classification Search .................. 425/96, 425/99, 100, 107, 215, 218, 345
See application file for complete search history.

(56) References Cited

U.S. PATENT DOCUMENTS 5,017,122 A * 5/1991 Staniforth .................. 425/100
6,079,968 A * 6/2000 Schmitz et al. ............... 425/96
6,884,054 B2 * 4/2005 Shimada ..................... 425/107

FOREIGN PATENT DOCUMENTS

JP 2002-327204 A 11/2002
JP 2003-211065 A 7/2003

OTHER PUBLICATIONS

International Search Report of PCT/JP2004/007067, date of mailing Sep. 21, 2004.

* cited by examiner

*Primary Examiner*—Richard Crispino
*Assistant Examiner*—Thu Khanh T Nguyen
(74) *Attorney, Agent, or Firm*—Westerman, Hattori, Daniels & Adrian, LLP

(57) ABSTRACT

A rotary powder compression molding machine configured to compression-mold powder filled in a die bore of a die mounted on a turret between a lower end face of an upper punch and an upper end face of a lower punch, is provided including powder lubricant jet means for jetting powder lubricant, the powder lubricant jet means including: jet nozzles, each of which has a concave surface, faces a respective one of end faces of the upper and lower punches at a respective powder lubricant jet position, and is configured to guide the powder lubricant along the concave surface and jet the powder lubricant in substantially one direction; an air stream providing mechanism configured to jet an air stream to adjacent the lower end face of the upper punch for preventing the powder lubricant jetted from the jet nozzles from scattering upwardly; and a charger device configured to charge the powder lubricant electrostatically upon jetting from the jet nozzles.

12 Claims, 14 Drawing Sheets

ROTARY POWDER COMPRESSION MOLDING MACHINE

TECHNICAL FIELD

The present invention relates to a rotary powder compression molding machine for compressing powder to mold tablets or the like.

BACKGROUND ART

Conventionally, in the preparation of medicinal tablets with use of a rotary powder compression molding machine of this type, if the material powder for such tablets consists only of prescribed drug ingredients, there may arise troubles including the so-called sticking such that the material powder or a tablet sticks to a punch or a die. A conventional method that has been generally employed to obviate such troubles includes mixing a powder lubricant, such as magnesium stearate, with prescribed drug ingredients to prepare material powder for tablets, and compressing the material powder into tablets, because this method is easy in the preparation of tablets.

With increasing attention focused on the geriatric care in recent years, there are increasing demands for a tablet of the type which can be dissolved easily in the oral cavity for aged persons or like persons to swallow it easily and for a tablet of the type which can be dissolved immediately after deglutition to exhibit its drug efficacy. However, such a tablet prepared by the aforementioned conventional preparation method has a difficulty in responding to such demands because the powder lubricant mixed therein acts to inhibit disintegration and dissolution of the tablet. There exists another problem that the powder lubricant mixed in the tablet makes the tablet easy to crack.

In view of the purpose of the powder lubricant to prevent the sticking, the powder lubricant need not be mixed with the prescribed drug ingredients. It must be quite possible that material powder consisting only of the prescribed drug ingredients is used if the powder lubricant is attached to a portion where the sticking is likely, such as a punch surface. Apparatus developed with attention focused on this point include one which is configured to spray and coat upper and lower punches and die bore with the powder lubricant prior to compression, and one which is configured to compress only the powder lubricant as a dummy prior to compression of intended tablets thereby coating the upper and lower punches and the die bore with the powder lubricant.

With such apparatus, however, the so-called contamination problem occurs such that the powder lubricant scatters around during spray coating and is then mixed into the prescribed drug ingredients, or, to the contrary, the prescribed drug ingredients are mixed into the powder lubricant during spraying. In addition, in some cases, the powder lubricant is attached to a punch and the like non-uniformly. Further, the latter apparatus calls for a compression mechanism for compressing the powder lubricant, thus raising problems that the apparatus is enlarged in size and that the compression speed lowers to about ½ of a typical compression speed.

Among such apparatus of the type configured to coat required portions with the powder lubricant as described above, there is an apparatus configured to charge the powder lubricant electrostatically prior to spray coating and then coat a mold for powder molding with the powder lubricant thus electrostatically charged, as described in patent document 1 (Japanese Patent Laid-Open Publication No. 2002-327204) for example. The invention described in patent document 1 is configured to electrostatically charge the powder lubricant by friction using a charger gun and then jet the powder lubricant.

In the case of the powder lubricant electrostatically charged, the charged condition of the powder lubricant is difficult to control because the powder lubricant is electrostatically charged by friction according to the invention described in the aforementioned patent document, though static electricity of the powder lubricant causes the powder lubricant to attach to the end faces of respective of the upper and lower punches and to the die bore of the die reliably. For this reason, equal amounts of the powder lubricant are attached to respective of the end face of the upper punch, the end face of the lower punch and the die bore of the die in spite of the fact that these end faces and die bore have different areas to be attached with the powder lubricant. This means that the amount of the powder lubricant attached to each of the lower punch and the die bore is insufficient because the lower punch and the die bore have a larger area to be covered with the powder lubricant than the upper punch.

DISCLOSURE OF INVENTION

It is an object of the present invention to eliminate the foregoing problems.

In order to attain this object, the present invention provides the following means. That is, the present invention provides a rotary powder compression molding machine wherein: a turret is rotatably mounted in a frame via a vertical shaft; dies each having a die bore are mounted on the turret; an upper punch and a lower punch are vertically slidably held above and below each of the dies; and with tips of respective of the upper and lower punches being inserted in the die bore, the upper and lower punches are pressed and moved toward each other to compression-mold powder filled in the die bore between a lower end face of the upper punch and an upper end face of the lower punch, the rotary powder compression molding machine characterized by comprising powder lubricant jet means for jetting powder lubricant against the end faces of respective of the upper and lower punches and against the die bore prior to filling of the powder into the die bore, the powder lubricant jet means comprising: a first jet nozzle configured to jet the powder lubricant placed at a powder lubricant jet position substantially toward the end face of the upper punch; a second jet nozzle configured to jet the powder lubricant placed at a powder lubricant jet position substantially toward the end face of the lower punch; and a charger device configured to charge the powder lubricant electrostatically upon jetting from each of the first and second jet nozzles, the charger device being capable of rendering the powder lubricant to be jetted against each of the lower punch and the die different from the powder lubricant to be jetted against the upper punch in electrostatically charged condition.

The powder lubricant used in the present invention is meant by powder having water repellency such as stearic acid, a stearate (metal salt of Al, K, Na, Ca, Mg or the like), or sodium lauryl sulfate. In compression molding, for example, tablets by the use of the powder compression molding machine, the powder lubricant serves to inhibit sticking of powdery raw drug material to the die bore or the tips of the upper and lower punches.

With this construction, the powder lubricant to be jetted from the first and second jet nozzles is electrostatically charged by the charger device and hence is attracted by and attached to the end faces of respective of the upper and lower punches and the inner periphery of the die bore substantially uniformly by electrostatic force. By rendering the powder lubricant to be jetted against the lower punch and the die different from the powder lubricant to be jetted against the upper punch in electrostatically charged condition, it is possible to allow an adequate amount of the powder lubricant to be attached to each of the lower punch and the die without shortage even if the lower punch and the die have a larger area to be covered with the powder lubricant than the upper punch. Thus, the efficiency in attaching the powder lubricant can be improved reliably.

The charger device preferably has first and second electrodes for producing first and second electric fields, respectively, through which the powder lubricant to be jetted from the first jet nozzle and the powder lubricant to be jetted from the second jet nozzle pass respectively. The charger device having such electrodes is capable of electrostatically charging the powder lubricant efficiently. In this case, preferably, the first and second jet nozzles each have a concave surface facing the end face of a respective one of the punches for guiding the powder lubricant before jetting, the concave surface of the first jet nozzle defining a space for the first electric field to be produced therein, the concave surface of the second jet nozzle defining a space for the second electric field to be produced therein.

Such electric fields thus produced are capable of reliably charging the whole of the powder lubricant guided along the concave surfaces of respective of the first and second jet nozzles immediately after jetting of the powder lubricant from the first and second jet nozzles. Moreover, the concave surface of each jet nozzle causes the powder lubricant to be jetted substantially in a direction toward the end face of the associated punch, thereby allowing the powder lubricant to reach each of the lower end face of the upper punch, the upper end face of the lower punch and the die bore efficiently.

To provide the powder lubricant with different charged conditions, the charger device preferably comprises first voltage application means for applying a first voltage to the first electrode, and second voltage application means for applying a second voltage to the second electrode, the second voltage being higher than the first voltage. With the charger device having such a feature, the second electric field produced by the second electrode is higher in electric intensity than the first electric field produced by the first electrode. Thus, it is possible to attach an increased amount of the powder lubricant to each of the upper end face of the lower punch and the die, hence, attach optimum amounts of the powder lubricant to the respective portions.

For the powder lubricant to be fed stably, the rotary powder compression molding machine preferably further comprises a powder lubricant jet device configured to pressure-feed the powder lubricant to the powder lubricant jet means, wherein the powder lubricant jet device and the powder lubricant jet means being in communication with each other via a feed pipeline from which influence of static electricity is eliminated. By thus providing communication between the powder lubricant jet means and the powder lubricant jet device, it is possible to feed the powder lubricant through the feed pipeline smoothly without attachment thereof within the feed pipeline due to the influence of static electricity, thereby to jet the powder lubricant continuously.

Such a feed pipeline preferably comprises an inner pipe formed from an insulating material for allowing the powder lubricant to pass therethrough, and an electrically conductive member for inhibiting the inner pipe from being electrostatically charged. The electrically conductive member of the pipeline thus structured is preferably grounded.

To minimize mixing of the powder lubricant into the powder to be compression-molded, the turret desirably has an upper surface formed with an insulating layer. To further reduce mixing of the powder lubricant into the powder, the die preferably has an upper surface formed with an insulating layer except a region of the upper surface around the die bore.

For an excess of the powder lubricant to be collected efficiently, the rotary powder compression molding machine is preferably provided with an air delivery hole for feeding a destaticizing air flow to the upper surface of the turret to destaticize residual powder lubricant on the upper surface of the die, and a suction hole for sucking in the residual powder lubricant destaticized. By thus collecting such residual powder lubricant that does not contribute to compression molding of the powder, it is possible to accurately determine the amount of powder lubricant actually used, which leads to an improvement in the efficiency of use of the powder lubricant.

For preventing the powder lubricant from scattering, the compression molding machine further comprises an air stream providing mechanism configured to jet air to adjacent the lower end face of the upper punch for preventing the powder lubricant jetted from the first jet nozzle from scattering upwardly, wherein the powder lubricant jet means further comprises a powder sucking mechanism configured to suck in the powder lubricant that is prevented from moving upwardly by the air stream providing mechanism.

With such a feature, the air stream providing mechanism generates an air stream adjacent the lower end face of the upper punch to prevent an excess of the powder lubricant that has not been attached to the lower end face of the upper punch from rising, thereby making it possible to prevent the powder lubricant from scattering. Accordingly, it becomes possible to, prevent such an excess of the powder lubricant from being attached to portions other than the lower end face of the upper punch thereby to allow the powder lubricant to be attached only to the lower end face of the upper punch efficiently.

What is more, such prevention of scattering of the powder lubricant makes it possible to obviate attachment of an excess of the powder lubricant to portions other than the lower end face of the upper punch, thereby preventing the occurrence of a problem that powder lubricant attached to such undesired portions produces frictional force when the upper punch operates and hence interferes with smooth operation of the upper punch. In addition, it is possible to avoid such an inconvenience that such an attached excess of the powder lubricant grows and is then mixed into the powder to be compression-molded.

Preferably, the powder lubricant jet means further comprises a powder sucking mechanism configured to suck in powder lubricant that is prevented from moving upwardly by the air stream providing mechanism. By thus sucking in an excess of the powder lubricant, it becomes possible to collect such an excess of powder lubricant efficiently.

To minimize scattering of an excess of the powder lubricant, the powder lubricant jet means further comprises a box member enclosing the powder lubricant jet position, wherein: the concave surfaces of respective of the first and second jet nozzles are located within the box member; and the powder sucking mechanism sucks in an excess of the powder lubricant scattering from the box member through the box member in cooperation with the air stream provided by the air stream providing mechanism.

For the powder lubricant to be guided substantially uniformly in substantially one direction, the concave surface of each of the jet nozzles is preferably shaped into a three-dimensional curved surface.

The present invention also provides a method of jetting powder lubricant against an upper punch, lower punch and die of a rotary powder compression molding machine comprises jetting one of two parts of the powder lubricant that are different from each other in electrostatically charged condition against the upper punch while jetting the other part against the lower punch and the die.

Such a method is capable of controlling the amount of powder lubricant to be attached to a target even when equal amounts of powder lubricant are jetted against different targets because the two parts of the powder lubricant are electrostatically charged differently. That is, since the lower punch and the die have a larger area requiring attachment of the powder lubricant than the upper punch, the amount of powder lubricant to be attached to such portions need be increased according to the difference in area. Required amounts of powder lubricant can be deposited by rendering the two parts of the powder lubricant different in electrostatically charged condition. Specifically, the part of the powder lubricant to be jetted against the lower punch and the die is preferably charged using a higher voltage than the voltage applied to charge the other part of the powder lubricant to be jetted against the upper punch.

BEST MODE FOR CARRYING OUT THE INVENTION

Hereinafter, one embodiment of the present invention will be described with reference to the drawings.

Figure 1:
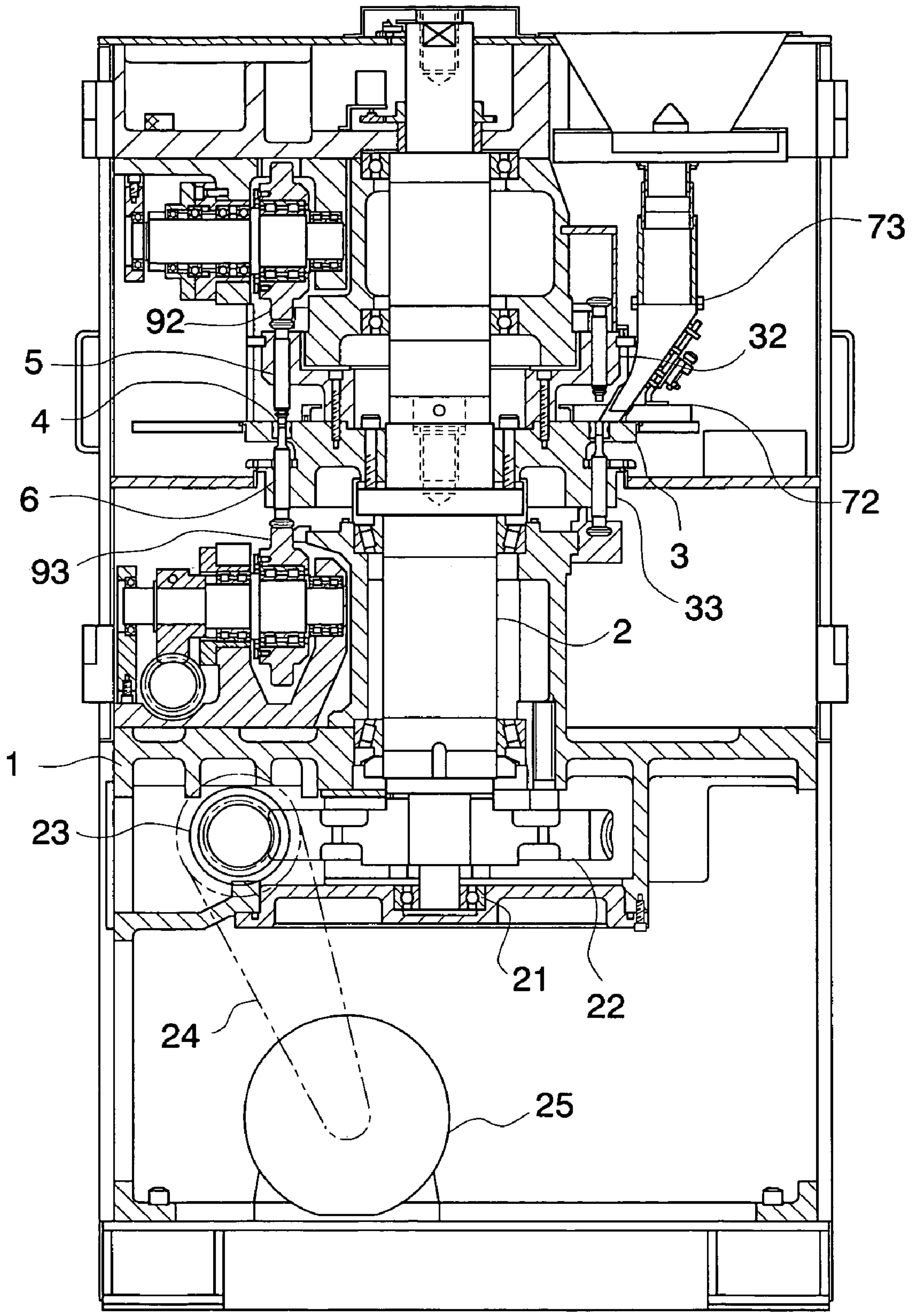
FIG. 1 is a sectional front elevation showing an entire rotary powder compression molding machine according to one embodiment of the present invention.

FIG. 1 shows the entire structure of a rotary powder compression molding machine according to the present invention. This rotary powder compression molding machine includes a powder lubricant jet device LS (see FIG. 9) configured to jet powder lubricant L, a turret 3 horizontally rotatably mounted in a frame 1 via a vertical shaft 2, a plurality of dies 4 disposed on the turret 3 at predetermined pitches, and upper and lower punches 5 and 6 vertically slidably held above and below each of the dies 4.

Specifically, the vertical shaft 2 rotatably supported by a bearing 21 is positioned substantially centrally of the frame 1. A worm wheel 22 is fixed to a lower end proximity portion of the vertical shaft 2. A motor 25 transmits rotational power to the worm wheel 22 via a worm 23 and a belt 24. The turret 3, which can be divided into two functional sections, is fixed to a head proximity portion of the vertical shaft 2.

The turret 3 comprises an upper punch holding section 32 located in an upper part of the turret 3 and holding the upper punch 5 for vertically slidable movement, and a die section 33 located in a lower part of the turret 3 to hold the lower punch 6 for vertically slidable movement and having plural die mounting holes on the same circumference for removably receiving dies 4 therein in a position opposed to the upper punch holding section 3.

The upper punch holding section 32 defines plural punch holding holes for holding upper punches 5 for sliding movement, while, similarly, the die section 33 defines plural punch holding holes for holding lower punches 5 for sliding movement. In this turret 3, these punch holding holes and the die mounting holes are formed so that lower punch 6, upper punch 5 and die 4 are positioned vertically with their respective center lines coinciding with each other.

Figure 3:
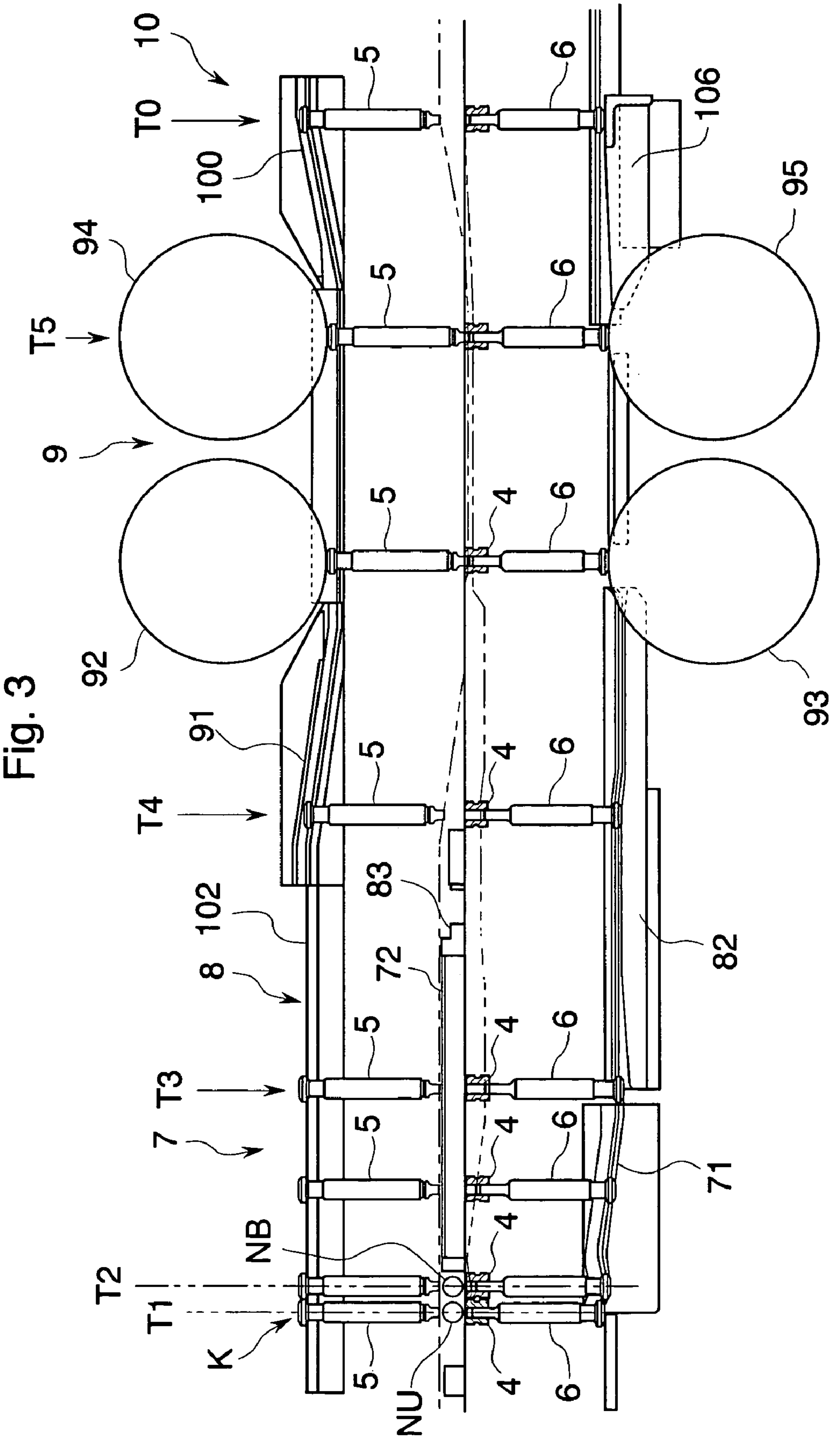
FIG. 3 is a developed view showing the turret according to the same embodiment as developed in the direction of its rotation.

The upper punch 5 and the lower punch 6 have respective large-diameter portions forming an upper end portion of the upper punch 5 and a lower end portion of the lower punch 6 as shown in FIG. 3. The large-diameter portion of each punch becomes engaged and guided by a cam to be described later or a like member for up and down movements. Each die 4 has a die bore 41 vertically extending therethrough for receiving punch tips of respective of the upper and lower punches 5 and 6. The upper punch 5 is provided in a lower end portion thereof with a bellows **5*n* for covering the trunk portion of the upper punch 5 to obviate attachment of powder lubricant L (to be described later) to the trunk portion when the upper punch 5 assumes a protruded position, the bellows 5*n* having an upper end fixed to the underside of the upper punch holding section 32 and a lower end fitted into an annular groove 5*m* defined in the lower end portion of the upper punch 5 (see FIG. 5**).

In this rotary powder compression molding machine, there are provided a powder filling section 7, a powder weight adjustment section 8, a compression molding section 9, a product ejection section 10 and a powder lubricant jet section K, which are arranged sequentially in the direction of rotation of the turret 3.

The powder filling section 7 has a configuration wherein a downward cam 71 lowers the lower punch 6 and a feed shoe 72 introduces powder having been fed onto the turret 3 into the die 4. It is a powder feed mechanism 73 that feeds the powder onto the turret 3.

The powder weight adjustment section 8 has a configuration wherein a quantity rail 82 causes the lower punch 8 to rise to a predetermined position and a scraper 83 removes an excess of the powder overflowing from the die 4 due to the lower punch 8 rising.

The compression molding section 9 comprises an upper punch lowering cam 91 for lowering the upper punch 5 along a downwardly inclined surface to insert its punch tip into the die 4, upper and lower pre-compression rolls 92 and 93 for provisionally compressing the powder in the die 4 by restraining the upper and lower punches 5 and 6 with their respective punch tips inserted in the die 4 from above and below, and upper and lower main compression rolls 94 and 95 for fully compressing the powder in the die 4 by restraining the upper and lower punches 5 and 6 from above and below.

Figure 2:
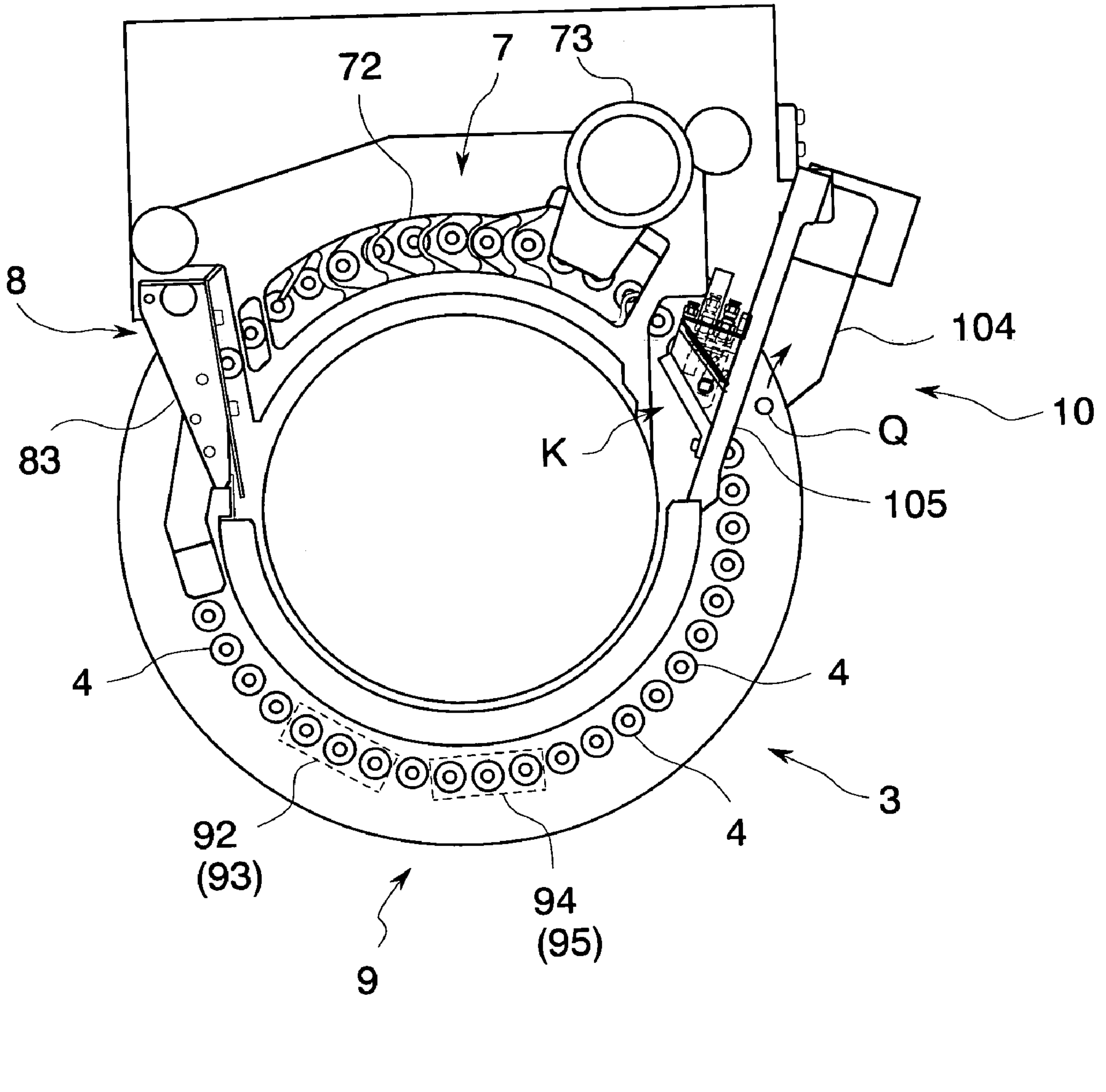
FIG. 2 is a schematic plan view showing the upper side of a turret according to the same embodiment.

As shown in FIGS. 2 and 3, the product ejection section 10 comprises an upper punch raising cam 100 for raising the upper punch 5 along an upwardly inclined surface to withdraw its punch tip from the die 4, a press-up rail 106 for biasing the lower punch 6 upwardly to press up a product Q out of the die 4 completely, and a guiding plate 105 for laterally guiding the product Q thus pressed out into a chute 104.

Figure 4:
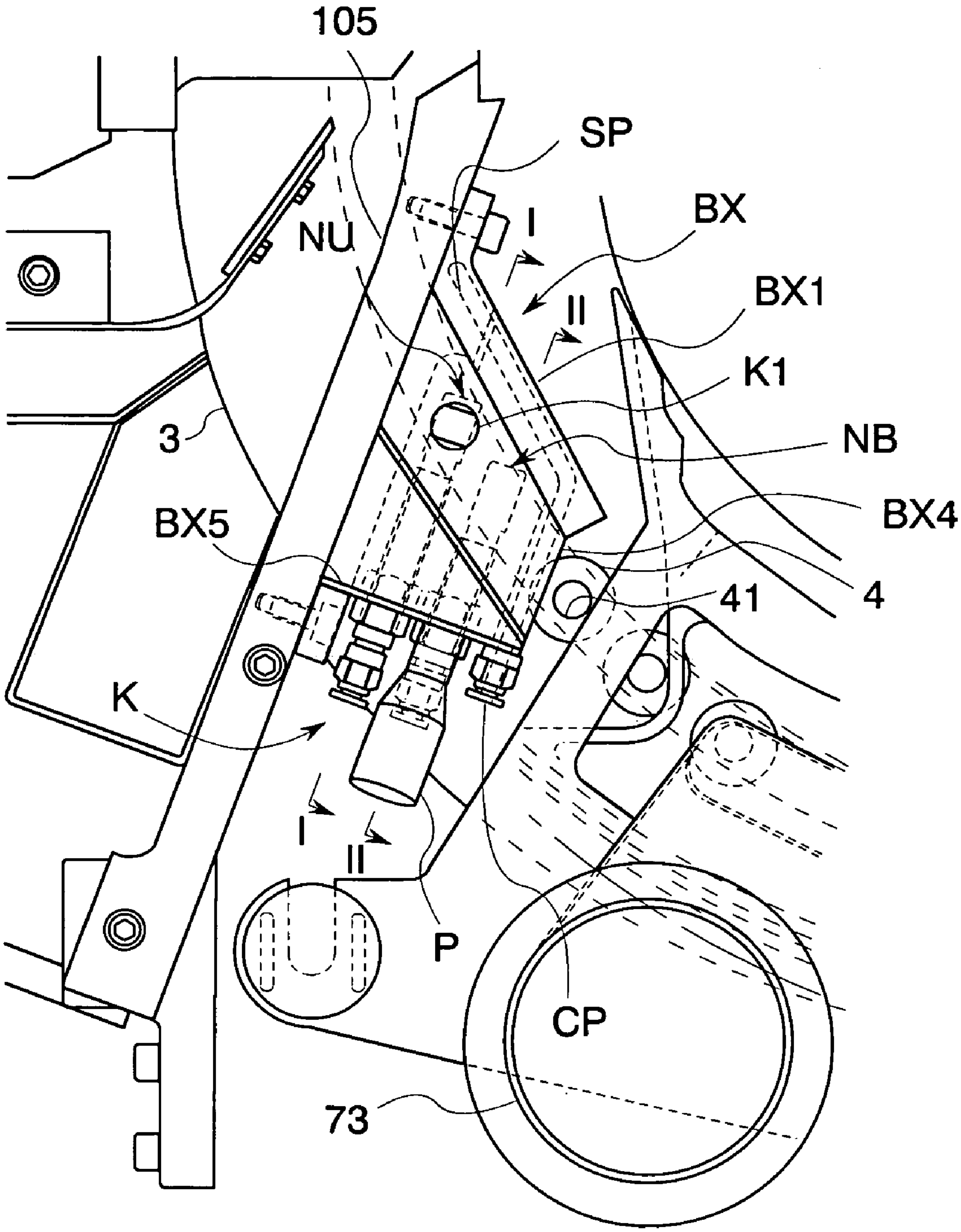
FIG. 4 is an enlarged plan view showing a powder lubricant jet section according to the same embodiment.
Figure 5:
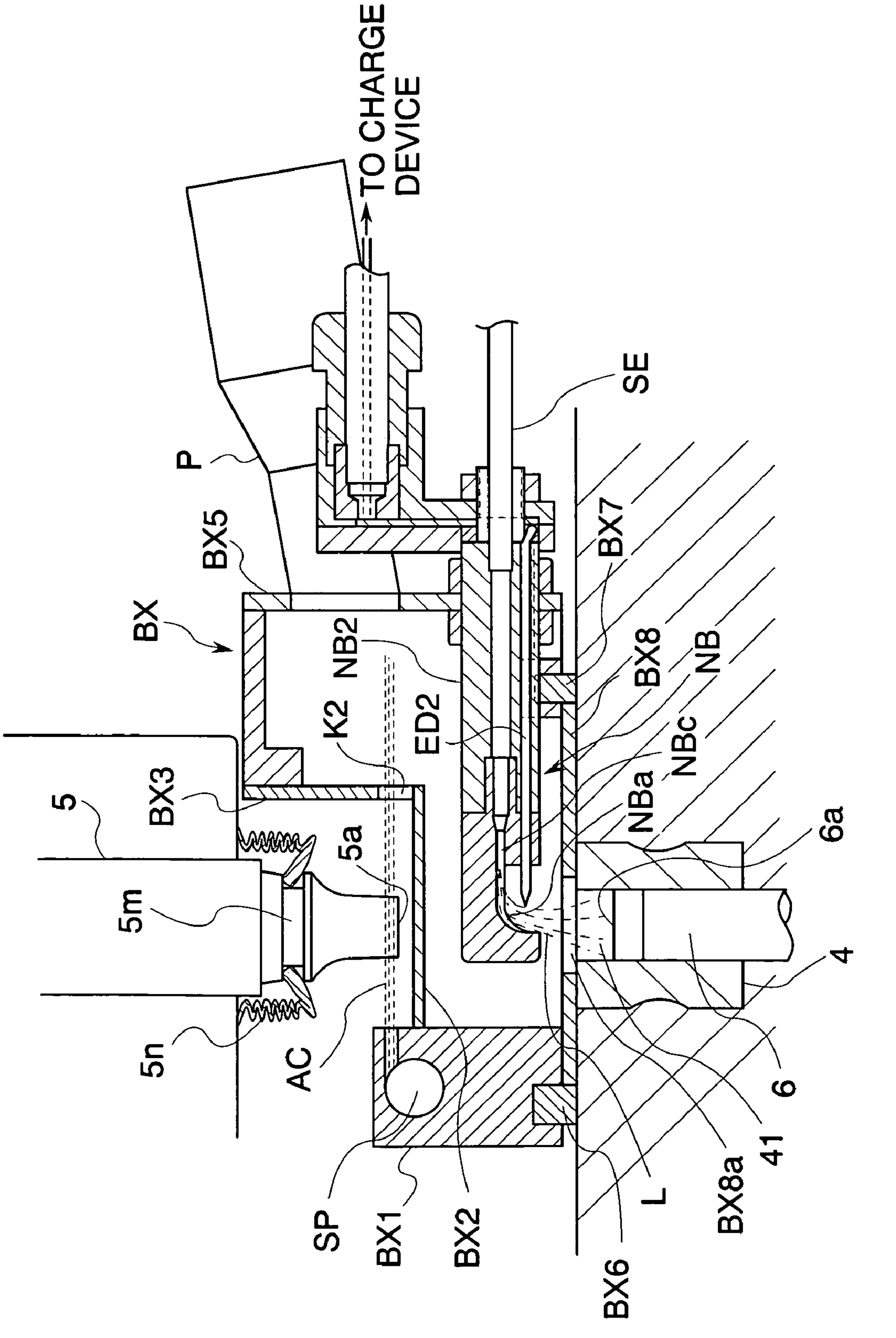
FIG. 5 is an end view along line I-I of FIG. 4.
Figure 6:
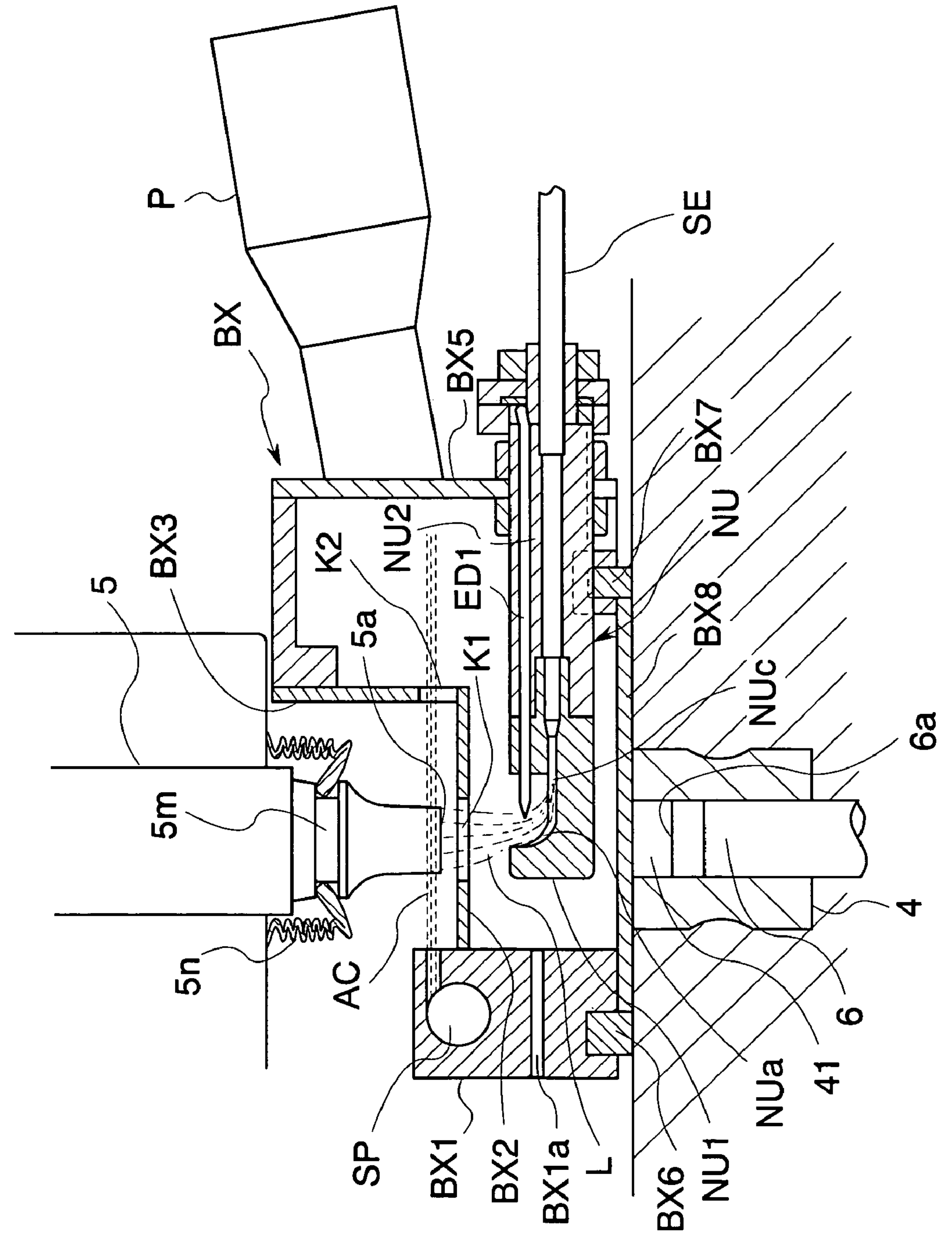
FIG. 6 is an end view along line II-II of FIG. 4.

The powder lubricant jet section K is located intermediate the product ejection section 10 and the powder filling section 7. As shown in FIGS. 4 and 5, the powder lubricant jet section K includes a box member BX enclosing a space in which powder lubricant L is continuously jetted except a through-hole K1 for allowing a part of powder lubricant L for the upper punch 5 to pass therethrough and a suction hole K2 for sucking in an air stream serving as an air curtain AC, thereby allowing powder lubricant L to be fed to each of lower end face 5*a* of the upper punch 5, upper end face 6*a* of the lower punch 6 and the inner periphery of the die bore 41 while preventing powder lubricant L from scattering. The powder lubricant jet section K has a configuration wherein: the box member BX accommodates therein the tip of an upper nozzle NU as the first jet nozzle for jetting powder lubricant L against the upper punch 5 and the tip of a lower nozzle NB as the second jet nozzle for jetting powder lubricant L against the lower punch 6 and the die bore; and air curtain AC is jetted above the through-hole K1 toward the suction hole K2.

Specifically, powder lubricant jet means, which is provided in the powder lubricant jet section K for feeding the upper and lower punches 5 and 6 and the die bore with powder lubricant L, includes the upper and lower nozzles NU and NB which, respectively, have concave surfaces NUa and NBa opposed to the end faces of respective of the upper and lower punches 5 and 6 at their respective powder lubricant feed positions and which are each configured to jet powder lubricant L in substantially one direction while guiding powder lubricant L along the concave surface NUa or NBa, and an air stream providing mechanism ACS for jetting an air stream to around the lower end face 5*a* of the upper punch 5 to generate air curtain AC which acts to prevent an excess of powder lubricant L jetted from the upper and lower nozzles NU and NB from scattering upwardly. The upper and lower nozzles NU and NB are fitted in the box member BX and connected to the powder lubricant jet device LS which is configured to dispense a very small amount of powder lubricant L and then pressure-feed it by means of pressurized gas.

Figure 7:
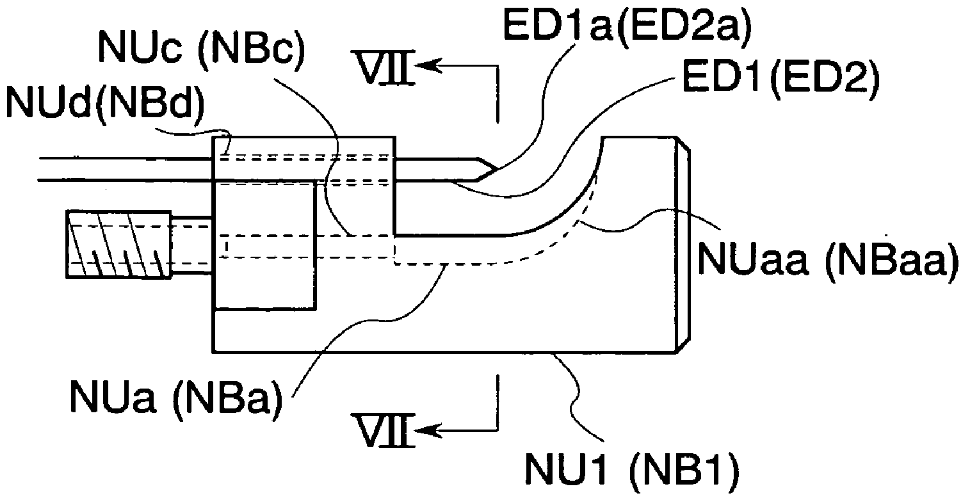
FIG. 7 is a side elevational view showing the tip of an upper (lower) nozzle according to the same embodiment.
Figure 8:
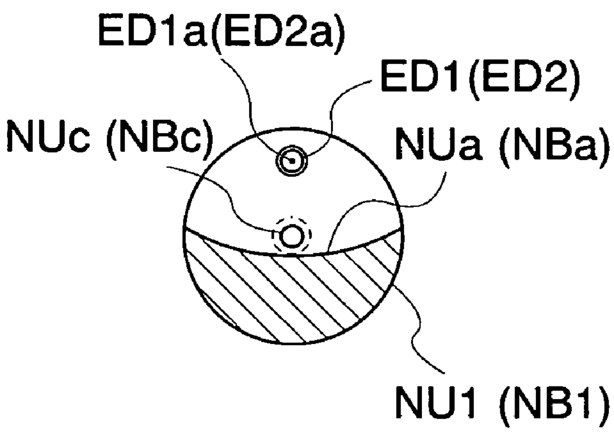
FIG. 8 is a sectional view taken along line VII-VII of FIG. 7.

The upper and lower nozzles NU and NB are formed from fluororesin for example and have respective nozzle tips NU1 and NB1 which are detatchable from nozzle bodies NU2 and NB2, respectively. Powder lubricant L is fed to each of the upper and lower nozzles NU and NB through a hose SE, which is a pipeline member formed from fluororesin for example. As shown in FIGS. 7 and 8, the nozzle tips NU1 and NB1 have respective concaved surfaces NUa and NBa each consisting of a three-dimensional curved surface, and respective introduction bores NUc and NBc which are continuous with the concave surfaces NUa and NBa, respectively. The introduction bores NUc and NBc have their respective inner peripheries, each of which is not flush with the associated one of the concave surfaces NUa and NBa but is open on the concave surface side to form a slight step with respect to the associated one of the concave surfaces NUa and NBa. Such a structure enables powder lubricant L to be guided toward the intended directions without attachment to the concave surfaces NUa and NBa upon jetting of powder lubricant L. The nozzle tips NU1 and NB1 are mounted in such a manner that their respective concave surfaces NUa and NBa are opposed to the upper and lower punches 5 and 6, respectively. Specifically, the nozzle tip NU1 of the upper nozzle NU is mounted as having its axis of mounting extending parallel with the turret 3 with its concave surface NUa oriented upward, while the nozzle tip NB1 of the lower nozzle NB mounted like the nozzle tip NU1 of the upper nozzle NU, with its concave surface NBa oriented downward. The upper nozzle NU is set so that the leading side of the concave surface NUa is positioned substantially immediately below the through-hole K1.

The upper and lower nozzles NU and NB are provided with first and second electrodes ED1 and ED2, respectively, for electrostatically charging powder lubricant L, each of which comprises stainless steel for example. Specifically, the upper and lower nozzles NU and NB define respective through-holes NUd and NBd which extend parallel with the introduction bores NUc and NBc, respectively, and pass through the nozzle tip NU1 and nozzle body NU2 of the upper nozzle NU and through the nozzle tip NB1 and nozzle body NB2 of the lower nozzle NB, respectively. The first and second electrodes ED1 and ED2 each shaped into a circular rod are inserted through the through-holes NUd and NBd, respectively. The first and second electrodes ED1 and ED2 have their respective tips ED1*a* and ED2*a* each sharpened like a cone or a needle and each lying on an extension of the center line of each electrode.

The through-holes NUd and NBd, through which the first and second electrodes ED1 and ED2 are inserted respectively, each extend from a respective one of the mounted ends of the nozzle bodies NU2 and NB2 to a respective one of wall surfaces facing respective of the concave surfaces NUa and NBa of the nozzle tips NU1 and NB1. The through-hole NUd is located above the introduction bore NUc when the upper nozzle NU is mounted, while the through-hole NBd located below the introduction hole NBc when the lower nozzle NB is mounted.

The first and second electrodes ED1 and ED2 are inserted into the respective through-holes NUd and NBd from the mounted ends of the respective nozzle bodies NU2 and NB2 until their tips ED1*a* and ED2*a* project into respective of the spaces defined by the concave surfaces NUa and NBa. Thus, the first and second electrodes ED1 and ED2 are mounted with their respective tips ED1*a* and ED2*a* opposed to respective of inclined surfaces NUaa and NBaa each traversing a respective one of the center lines of the through-holes NUd and NBd. By applying different high d.c. voltages to respective of the first and second electrodes ED1 and ED2 thus positioned, first and second electric fields having different electric intensities are produced between the tip ED1*a* and the inclined surface NUaa of the concave surface NUa and between the tip ED2*a* and the inclined surface NBaa of the concave surface NBa, respectively.

That is, the rotary powder compression molding machine according to this embodiment is configured to jet two parts of the powder lubricant in different charged conditions against the upper and lower punches and the die, one part against the upper punch and the other part against the lower punch and the die. By application of the first and second electric fields having different electric intensities, the two parts of the powder lubricant which are different from each other in electrostatically charged condition are provided. Specifically, the two parts of the powder lubricant are jetted into respective of the first and second electric fields so as to be electrostatically charged differently. This operation will be described in detail later.

The box member BX, which is formed from a synthetic resin such as a fluororesin for example, is secured to the guiding plate 105 on the side opposite to the feed shoe 72 in such a manner as to be electrically insulated from the turret 3. The box member BX comprises a first sidewall BX1 having an air feed path SP therein for feeding air to generate air curtain and an air intake hole BX1*a*, a first upper wall BX2 fixed to the first sidewall BX1 so as to extend horizontally and having the through-hole K1 at a location coinciding with the upper punch 5, a second upper wall BX3 joined with the first upper wall BX2 so as to extend continuously therefrom and having the suction hole K2 at a location adjacent the joint with the first upper wall BX2 for sucking in air curtain AC, a second sidewall BX4 fixed to the first sidewall BX1 so as to extend parallel with the guiding plate 105 and having a guide path for guiding air to generate air curtain, a third sidewall BX5 joined with the second sidewall BX4 so as to extend perpendicularly therefrom in plan view, electrically insulating elastic members BX6 and BX7 sealing a clearance between the turret 3 and the first sidewall BX1 and between the turret 3 and lower surfaces of the upper and lower nozzles NU and NB, and a bottom plate BX8 formed from, for example, a fluororesin and located inwardly of the elastic members BX6 and BX7 to close the bottom of the box member BX.

On the third sidewall BX5 of the box member BX, the upper and lower nozzles NU and NB and a dust collecting pipeline P are mounted. The second sidewall 4 has an end face mounted with a connector section CP for introducing air through the third sidewall BX5 to generate air curtain. The bottom plate BX has a feed hole BX8*a* in a portion located coinciding with the track of the die 4 for allowing powder lubricant L jetted from the lower nozzle NB to pass therethrough, the feed hole BX8*a* having a slightly larger diameter than the die bore 41. The provision of the bottom plate BX8 thus structured makes it possible to limit attachment of powder lubricant L to the turret 3 within a ring-shaped region having a width equal to the diameter of the feed hole BX8*a* even when the turret 3 is in an electrostatically charged condition, thereby minimizing the attachment of powder lubricant L to the turret 3. The connector section CP is connected to an air compressor (not shown) configured to generate high-pressure air for forming air curtain AC. The air compressor, feed path SP and connector section CP form an air stream providing mechanism ACS. The dust collecting pipeline P, a dust collector LS5 connected thereto and the box member BX form a powder sucking mechanism.

Figure 9:
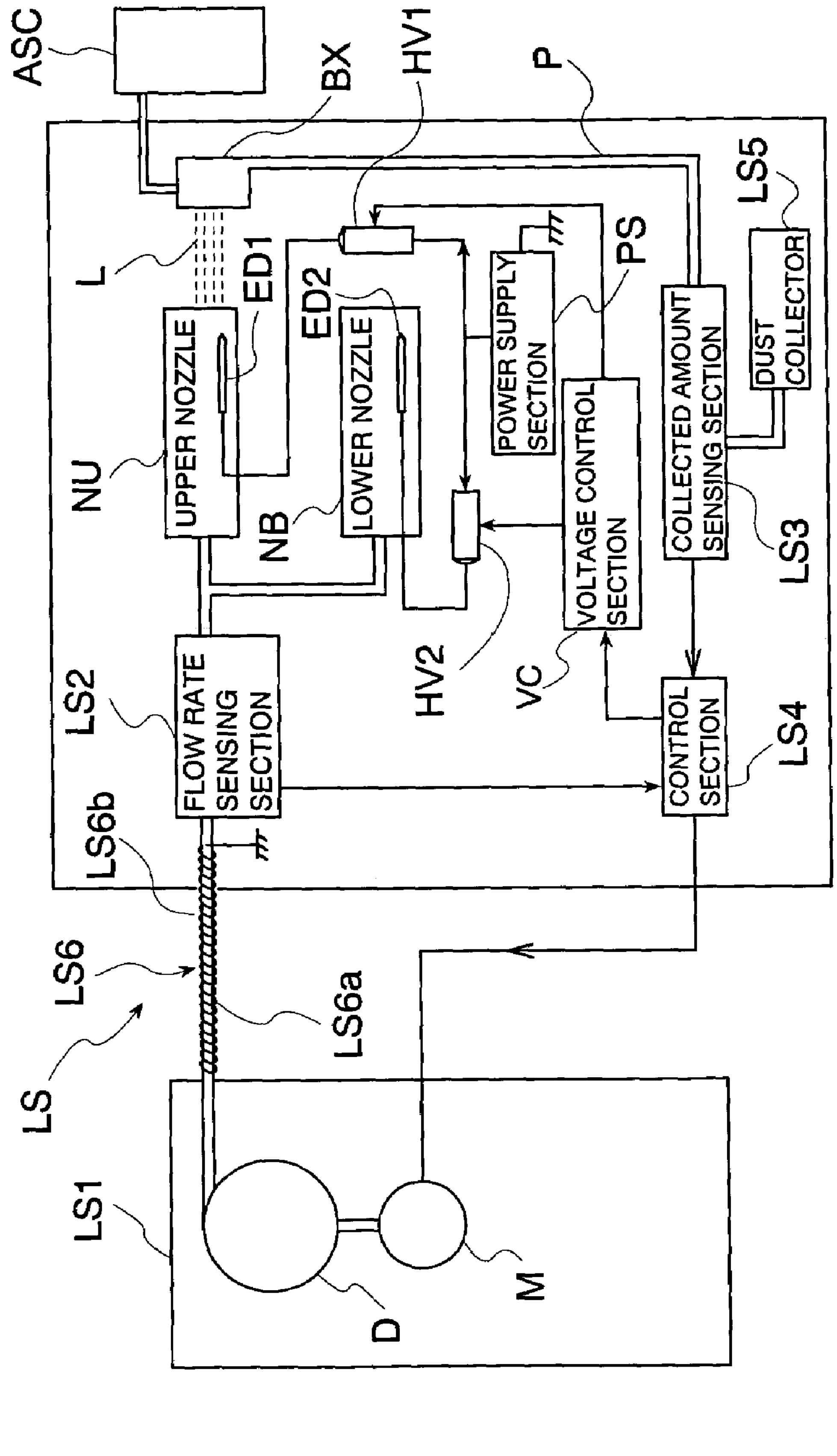
FIG. 9 is a block diagram schematically showing the configuration of a powder lubricant feeder device according to the same embodiment.

As shown in FIG. 9, the powder lubricant jet device LS includes a powder lubricant feed section LS1 configured to feed powder lubricant L attached to the outer periphery of a rotating drum D driven by a motor M by means of an air flow, a flow rate sensing section LS2 for sensing the flow rate of powder lubricant L fed from the powder lubricant feed section LS1, a collected amount sensing section LS3 for sensing the amount of powder lubricant L that has been jetted from the upper and lower nozzles NU and NB but collected without attaching to the upper and lower punches 5 and 6 and the die bore, a control section LS4 for controlling the powder lubricant feed section LS1 based on the amounts of powder lubricant L sensed by the flow rate sensing section LS2 and the collected amount sensing section LS3, the dust collector LS5 forming part of the dust collecting mechanism, and a charger device CD for electrostatically charging powder lubricant L. In the powder lubricant jet device LS, the powder lubricant feed section LS1, power supply section PS of the charger device CD, collected amount sensing section LS3, control section LS4 and dust collector LS5 are located exteriorly of the rotary powder compression molding machine, while the flow rate sensing section LS2, upper and lower nozzles NU and NB, box member BX and first and second high voltage generators HV1 and HV2 are located interiorly of the rotary powder compression molding machine.

The powder lubricant feed section LS1 feeds a slight amount of powder lubricant L, for example, 5 to 25 g per hour to the flow rate sensing section LS2 through the feed pipeline LS 6. The flow rate sensing section LS2 senses the flow rate of powder lubricant L either optically by low-angle light scattering or electrically by capacitive pickup or a like method. The control section LS4 calculates the difference between a value thus sensed and a value sensed by the collected amount sensing section LS 3 and feedback-control the powder lubricant feed section LS1 to adjust the flow rate of powder lubricant L to a predetermined value.

For preventing powder lubricant L from attaching to the feed pipeline LS6, the feed pipeline LS6 comprises a transparent colorless inner pipe LS6*a* formed from an insulator such as a fluororesin for example, and a shield member LS6*b* wrapped around the outer periphery of the inner pipe LS6*a*, the shield member LS6*b* comprising an electrically conductive material such as aluminum wire for example. The shield member LS6*b* is grounded electrically and wrapped around the inner pipe LS6*a* with its turns spaced from each other relatively largely so as to allow powder lubricant L moving in the inner pipe LS6*a* to be visually observed. That is, the turns of the shield member LS6*b* wrapped around the outer periphery of the inner pipe LS6*a* are spaced one from another a distance such as to allow powder lubricant L moving in the inner pipe LS6*a* to be visually observed through the clearance between adjacent ones of the turns. The feed pipeline LS6 thus structured to comprise the inner pipe LS6*a* and the shield member LS6*b* is capable of preventing the inner pipe LS6*a* from being electrostatically charged due to friction between the inner pipe LS6*a* and powder lubricant L passing therethrough. Thus, it is possible to eliminate problems such that: the inner periphery of the inner pipe LS6*a* attracts powder lubricant L thereto to impede smooth feed of powder lubricant L; and the amount of powder lubricant L used cannot be accurately calculated because of uncollected powder lubricant L attached to the inner pipe LS6*a*.

The charger device CD includes a power supply section PS configured to produce d.c. voltage, first and second high voltage generators HV1 and HV2 each configured to convert d.c. voltage outputted from the power supply section PS to a high voltage, a voltage control section VC configured to control output voltage values of respective of the first and second high voltage generators HV1 and HV2, namely, first and second d.c. voltages, and first and second electrodes ED1 and ED2 to be applied with the first high voltage outputted from the first high voltage generator HV1 and the second high voltage outputted from the second high voltage generator HV2, respectively.

The first and second high voltage generators HV1 and HV2 are each capable of continuously varying respective output voltage independently. The first and second high voltage generators HV1 and HV2 are each connected to the power supply section PS while being connected to the first and second electrodes ED1 and ED2, respectively, in series. With such a configuration, the first and second electrodes ED1 and ED2 are each applied with a negative high voltage. An output terminal of each of the first and second high voltage generators HV1 and HV2 that is held at a reference potential is grounded and, accordingly, at least the upper and lower punches 5 and 6 and the die 4 are grounded. In the present embodiment, the turret 3 is grounded to ground the upper and lower punches 5 and 6 and the die 4.

The output voltage values of respective of the first and second high voltage generators HV1 and HV2 are controlled by the voltage control section VC in accordance with the collected amount of powder lubricant L for example. Prior to this control, the first and second high voltage generators HV1 and HV2 are set so that the value of the first d.c. voltage to be outputted from the first high voltage generator HV1 is essentially lower than the value of the second d.c. voltage to be outputted from the second high voltage generator HV2. Since the part of powder lubricant L jetted from the lower nozzle NB needs to be attached to both the upwardly oriented upper end face **6*a* of the lower punch 6 and the inner periphery of the die bore 41 of the die 4 in contrast to the other part of powder lubricant L jetted from the upper nozzle NU which needs to be attached only to the downwardly oriented lower end face 5*a* of the upper punch 5, the voltage value of the second d.c. voltage is made higher than that of the first d.c. voltage to increase the total amount of powder lubricant L to be attached to the lower punch 6 and the die 4**.

Figure 10:
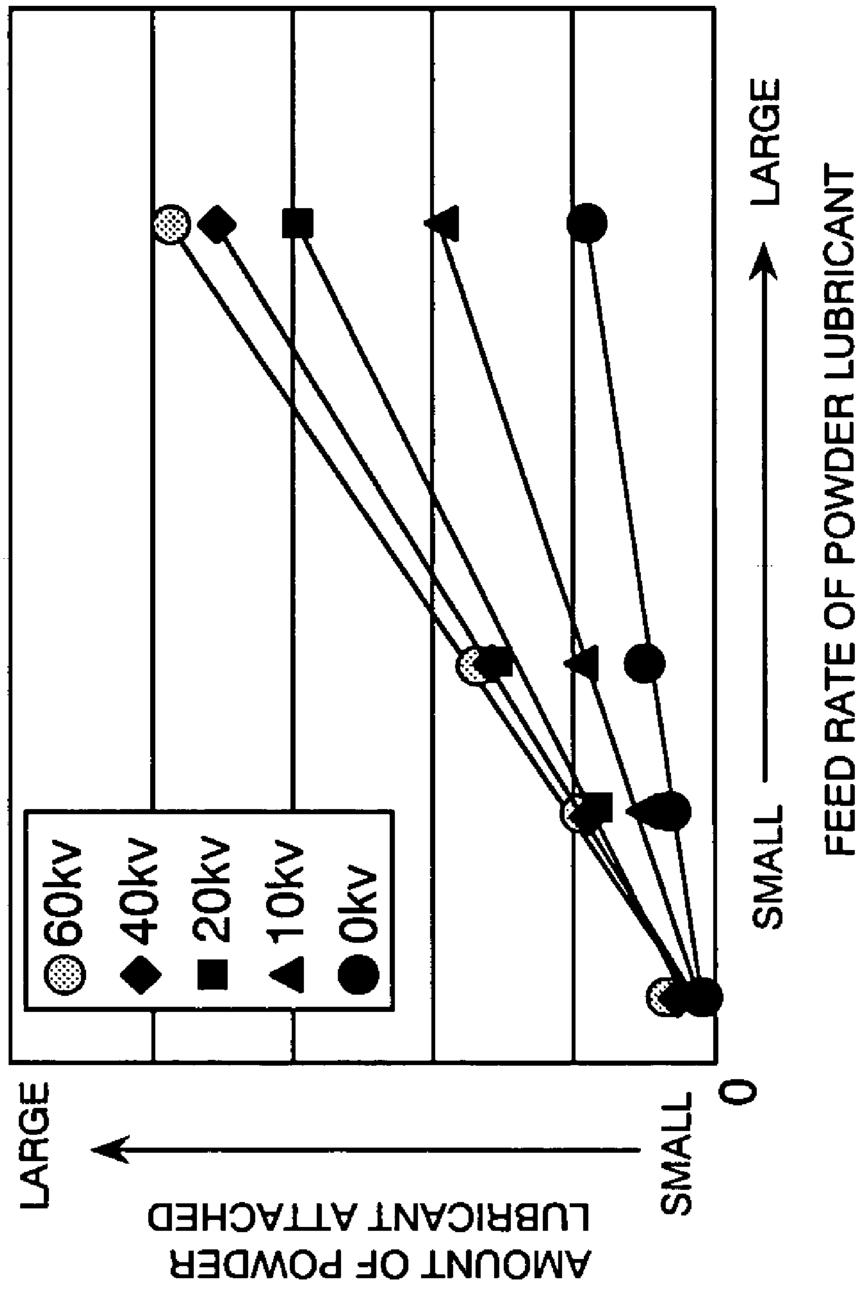
FIG. 10 is a graph showing the relationship between the amount of powder lubricant fed and the amount of powder lubricant attached.

The amount of powder lubricant L attached increases proportionally to the increase in the voltage value of d.c. voltage for electrostatically charging powder lubricant L. That is, with equal feed rates of powder lubricant L, the amount of powder lubricant L attached increases with increasing d.c. voltage value. This tendency becomes more conspicuous as the feed rate of powder lubricant L increases. When the feed rate of powder lubricant L is small, to the contrary, the amount of attached powder lubricant L is not so influenced by the voltage value of d.c. voltage and, there is no conspicuous difference in the amount of attached powder lubricant L. FIG. 10 shows the relationship between the feed rate of powder lubricant L and the amount of powder lubricant L attached, which relationship is represented using the voltage value of d.c. voltage as a parameter. The amount of attached powder lubricant L is a value converted from the amount of powder lubricant L attached to a tablet prepared by compression.

The following table 1 shows test results on the degree of variation in the amount of attached powder lubricant L obtained when powder lubricant L was not electrostatically charged and when powder lubricant was electrostatically charged by, for example, the first d.c. voltage, which was adjusted to 60 kV, outputted from the first high voltage generator HV1. In these test results, the amount of attached powder lubricant L (represented as the powder lubricant amount in table 1) is a value converted from the amount of powder lubricant L attached to a tablet prepared by compression, as described above. The test was conducted under the conditions: the number of revolutions of the rotating drum D was held constant; different feed rates of powder lubricant L were set by using grooves of different shapes (different capacities) filled with powder lubricant L; and powder lubricant L was charged differently. Ten amounts of powder lubricant L attached to tablets prepared by compression were sampled and the ten samples were statistically processed by arithmetic computation to find a coefficient of variation CV. A variation in the amount of attached powder lubricant L can be evaluated by comparison between coefficients of variation CV obtained under different conditions.

As apparent from the test results shown in table 1, the coefficient of variation CV obtained when powder lubricant L was electrostatically charged was about ½ of that obtained when powder lubricant L was not electrostatically charged, notwithstanding the fact that the feed rate of electrostatically charged powder lubricant L was lower than that of charge-free powder lubricant L. Thus, it was proved that electrostatic charging of powder lubricant L made it possible to attach a very small amount of powder lubricant L to the upper and lower punches 5 and 6 and the die 4 efficiently with less variation on a tablet-by-tablet basis.

TABLE 1

EVALUATION OF VARIATION IN POWDER LUBRICANT AMOUNT ATTACHED TO TABLETS

| | | 1-1-1 | 2-1-5 |
|---|---|---|---|
| FEED RATE (g/h) | | 80 | 24 |
| ROTOR GROOVE (WIDTH*DEPTH)(mm) | | 2.0 * 2.0 | 1.0 * 0.8 |
| NUMBER OF REVOLUTIONS OF ROTOR (rpm) | | 8 | 8 |
| OUTPUT VOLTAGE VALUE OF HIGH VOLTAGE GENERATOR (kV) | | 0 | 60 |
| POWDER LUBRICANT AMOUNT (Mg-St) (mg/tablet) | 1 | 7.8.E−02 | 7.7.E−02 |
| | 2 | 8.7.E−02 | 7.2.E−02 |
| | 3 | 7.8.E−02 | 7.7.E−02 |
| | 4 | 6.6.E−02 | 7.5.E−02 |
| | 5 | 7.8.E−02 | 8.0.E−02 |
| | 6 | 7.6.E−02 | 9.5.E−02 |
| | 7 | 8.7.E−02 | 7.7.E−02 |
| | 8 | 7.8.E−02 | 7.8.E−02 |
| | 9 | 1.1.E−02 | 7.5.E−02 |
| | 10 | 8.0.E−02 | 7.7.E−02 |
| MEAN VALUE (mg/tablet) | | 8.2.E−02 | 7.8.E−02 |
| MAXIMUM VALUE (mg/tablet) | | 1.1.E−02 | 9.5.E−02 |
| MINIMUM VALUE (mg/tablet) | | 6.6.E−02 | 7.2.E−02 |
| VARIATION | | 4.7.E−02 | 2.3.E−02 |
| STANDARD DEVIATION | | 1.2.E−02 | 5.8.E−02 |
| COEFFICIENT OF VARIATION CV (%) | | 1.4.E+01 | 7.4.E+00 |

Note:
the notation, for example, "7.6.E−02" appearing in table 1 means $7.6 * 10^{-2}$.
(hereinafter will be left blank)

When there are variations, or increase and decrease in the amount of colleted powder lubricant L per unit time, the first and second high voltage generators HV1 and HV2 are controlled so that the collected amount approximates to a reference collected amount. Specifically, the difference between the collected amount of powder lubricant L and the reference collected amount is calculated. If the collected amount is larger than the reference amount, it is determined that attachment of powder lubricant L is unsatisfactory; i.e., the amount of attached powder lubricant L has decreased. Then, the voltage control section VC performs control over the first and second high voltage generators HV1 and HV2 so as to raise the first and second d.c. voltages correspondingly to that difference. On the contrary, if the colleted amount is smaller than the reference amount, it is determined that attachment of powder lubricant L is satisfactory; i.e., the amount of attached powder lubricant L has increased. Then, the voltage control section VC performs control over the first and second high voltage generators HV1 and HV2 so as to raise the first and second d.c. voltages correspondingly to that minus difference. In this case, the first and second high voltage generators HV1 and HV2 are controlled to the same extent at a time so that the first and second d.c. voltages are raised or lowered by equal width of voltage. The first and second high voltage generators HV1 and HV2 may be controlled so that the first and second d.c. voltages are raised or lowered by different voltage widths based on the ratios thereof to basic first and second d.c. voltages.

With such an arrangement, when the powder lubricant jet device LS is powered on before jetting of powder lubricant L, the potential of each of the first and second electrodes ED1 and ED2 becomes a negative high potential relative to the potential of each of the upper punch 5, lower punch 6, die 4 and turret 3. At that time, if the first high voltage generator HV1 is controlled so that a negative high voltage to be applied to the first electrode ED1 is fixed to a voltage value ranging between 20 KV and 40 KV, for example, 30 KV, a non-uniform electric field is produced in the space between the first electrode ED1 and the concave surface NUa. This is because, though the upper nozzle NU formed from a fluororesin is charged negatively relative to the first electrode ED1, the voltage value of electrostatic charge on the upper nozzle NU is lower than the value of voltage applied to the first electrode ED1 and, hence, a potential difference of about 29 KV for example is produced between the two. On the other hand, if the second high voltage generator HV2 is controlled so that a negative high voltage to be applied to the second electrode ED2 is fixed to a voltage value ranging between 40 KV and 60 KV, for example, 50 KV, a non-uniform electric field is produced in the space between the second electrode ED2 and the concave surface NBa for the same reason as stated with respect to the first electrode ED1.

When powder lubricant L is jetted into the space defined by each of the concave surfaces NUa and NBa of the nozzle tips NU1 and NB1 in which such a non-uniform electric field is produced, powder lubricant L passing through the non-uniform electric field is electrostatically charged more negatively. Since the lower nozzle NB and the upper nozzle NU are each formed from a fluororesin in the present embodiment, powder lubricant L is electrostatically charged negatively due to friction with the fluororesin. Subsequently, powder lubricant L just jetted from each of the nozzle tips NB1 and NU1 of the lower and upper nozzles NB and NU passes through the non-uniform electric field produced in each of the spaces between the first electrode ED1 and the concave surface NUa and between the second electrode ED2 and the concave surface NBa, so that powder lubricant L becomes charged more negatively, i.e., at a higher potential.

On the other hand, the upper and lower punches 5 and 6 and the die 4 to receive jetted powder lubricant L are each at a ground potential, i.e., at a reference potential relative to the potential of powder lubricant L electrostatically charged by the charger device CD. For this reason, negatively charged powder lubricant L jetted against the upper and lower punches 5 and 6 and the die 4 is attracted toward the upper and lower punches 5 and 6 and the die 4 and then attached to the target surfaces, i.e., the lower end face 5*a* of the upper punch 5, the upper end face 6*a* of the lower punch 6 and the inner periphery of the die bore 41 of the die 4 by electrostatic force. Powder lubricant L once attached to the target surfaces of respective of the upper and lower punches 5 and 6 and die 4 remains attached by electrostatic force and hence will not be released therefrom. Thus, it is possible to prevent powder compressed from sticking to each of the lower end face 5*a* of the upper punch 5, the upper end face 6*a* of the lower punch 6 and the inner periphery of the die bore 41 of the die 4 effectively in compression molding of the powder. Even if powder lubricant L is released from any one of the target surfaces, it is possible to minimize mixing of powder lubricant L into the powder to be compressed because the amount of attached powder lubricant L is very small. Thus, the resulting molded product can be prevented from being affected in hardness. Though the total area of the upper end face 6*a* of the lower punch 6 and the inner periphery of the die bore 41 of the die 4 is larger than the area of the lower end face 5*a* of the upper punch 5, the electric field produced in the space between the second electrode ED2 and the concave surface NBa, which has a higher electric intensity than that produced in the space between the first electrode ED1 and the concave surface NUa, electrostatically charges powder lubricant L jetted downwardly. For this reason, it is possible to allow powder lubricant L to be attached to the upper end face 6*a* of the lower punch 6 and the inner periphery of the die bore 41 as well as to the lower end face 5*a* of the upper punch 5 at the same rate, thereby to ensure equal amounts of attached powder lubricant L per unit area for such target surfaces.

In this embodiment, powder lubricant L is jetted with the timing to be described below. The jet timing in the tablet compression molding process will be described with reference to FIG. 3. In this figure, reference characters T0 to T5 each indicate a phase. The upper and lower punches 5 and 6 in a phase just passed through the product ejection section 10 are held at their respective highest positions (T0). Thereafter, the upper and lower punches 5 and 6, as held at their respective highest positions, are moved to the powder lubricant jet section K by rotation of the turret 3 (T1). In this phase, powder lubricant L is jetted against the upper punch 5 first. Subsequently, with rotation of the turret 3, the lower punch 6 is lowered to a position at which the inner periphery of the die bore 41 becomes exposed above the tip of the lower punch 6 at the starting end portion of the downward cam 71. In this phase, powder lubricant L is jetted against the lower punch 6 and the die 4 (T2). In this way, powder lubricant L can be attached to the upper end face 6*a* of the lower punch 6 and the inner periphery of the die bore 41.

Since powder lubricant L is thus jetted from the upper nozzle NU at the time when the upper punch 5 is held at its highest position, jetted powder lubricant L is attached to the lower end face 5*a* of the upper punch in a concentrated fashion by electrostatic force. Since powder lubricant L is negatively charged by the charger device CD while the lower end face 5*a* of the upper punch 5 is electrically grounded, powder lubricant L is attracted toward and attached to the lower end face 5*a* of the upper punch 5 by electrostatic force.

Thereafter, the lower punch 6 paired with the upper punch 5 and the die 4, which are held in the aforementioned positions, pass below the lower nozzle NB and, hence, powder lubricant L jetted from the lower nozzle NB is attached to the lower punch 6 and the inner periphery of the die bore 41. Since the upper end face 6*a* of the lower punch 6 is held at the reference potential, negatively charged powder lubricant L is attracted toward and attached to each of the upper end face 6*a* of the lower punch 6 and the inner periphery of the die bore 41 by electrostatic force.

Since powder lubricant L is jetted as guided along the concave surfaces NUa and NBa of the upper and lower nozzles NU and NB, powder lubricant L is diffused substantially uniformly over each of the lower end face 5*a* of the upper punch 5, the upper end face 6*a* of the lower punch 6 and the inner periphery of the die bore 41. Specifically, the concave surfaces NUa and NBa are each a three-dimensional curved surface and, accordingly, powder lubricant L delivered from each of the introduction bores NUc and NBc impinges upon each of the concave surfaces NUa and NBa and then moves along the concave surface in the delivery direction and in a direction transverse of the delivery direction. Since the concave surface NUa of the upper nozzle NU is opposed to the through-hole K1 located just above the concave surface NUa, powder lubricant L passes through the through-hole K1 and then reaches the lower end face 5*a* of the upper punch 5. In the case of the lower nozzle NB, powder lubricant L guided along the concave surface NBa directly reaches each of the lower end face 6*a* of the lower punch 6 and the inner periphery of the die bore 41. Thus, powder lubricant L is substantially uniformly attached to each of the lower end face 5*a* of the upper punch 5, the upper end face 6*a* of the lower punch 6 and the inner periphery of the die bore 41 extending to a predetermined depth substantially entirely. Since air curtain AC extending across the upper punch 5 is present above the lower end face 5*a* of the upper punch 5, a fraction of powder lubricant L that has not been attached to the lower end face 5*a* of the upper punch 5 is brought to the suction hole K2 by the air stream of air curtain AC, passed through the dust collecting pipeline P and the collected amount sensing section LS3, and then collected by the dust collector LS5. In the case of the lower nozzle NB having the downwardly oriented concave surface NBa, an excess of powder lubricant L that has upwardly bounced off the upper end face 6*a* of the lower punch 6 and the turret 6 passes along the first upper wall BX2 into the dust collecting pipeline P, while a fraction of the excess of powder lubricant L that has flowed out of the through-hole K1 is brought to the section hole K2 by the air stream of air curtain AC and then introduced into the dust collecting pipeline P as in the case of the upper nozzle NU.

Thereafter, when the lower punch 6 is moved to the powder filling section 7 by rotation of the turret 3, the lower punch 6 is first lowered to a middle position by the guiding action of the first half of the downward cam 71 and then further lowered to a lower position by the guiding action of the second half of the downward cam 71(T3). During this lowering operation, powder released onto the turret 3 from the powder feed mechanism 73 is introduced uniformly to the turret 3 by the powder guiding action of the feed shoe 72. Subsequently, the lower punch 6 is raised slightly to a predetermined height position as it runs on the quantity rail 82, whereby a predetermined amount of powder is filled in the die 4. The die 4 held in this condition passes under the scraper 83, so that powder overflowing the die 4 is leveled off and gathered toward the center of the turret 3. During this operation, the upper punch 5 is held at its highest position by the guide rail 102.

Thereafter, the upper punch 5 is lowered by the guiding action of the upper punch lowering cam 91 (T4), so that its punch tip is inserted into the die bore 4. Subsequently, the pair of upper and lower punches 5 and 6 passes between the upper and lower pre-compression rollers 92 and 93 and then between the upper and lower main compression rollers 94 and 95 to compression-mold the powder in the die 4 (T5).

In the product ejection section 10 following the compression molding section, the upper punch 5 is raised by the guiding action of the upper punch raising cam 100 until its punch tip is withdrawn from the die 4 and, thereafter, the lower punch 6 is pressed up by the press-up rail 106 until the product Q in the die 4 is pressed out of the die 4 onto the turret 3. The product Q is then guided to above the chute 104 by the guiding action of the guiding plate 105 and taken out of the compression molding machine A. Thereafter, the upper punch 5 is further raised as guided by the upper punch raising cam 100. In this way, powder can be compression-molded into predetermined products Q repetitively and consecutively.

With the rotary powder compression molding machine thus constructed according to the present embodiment, powder lubricant L is guided along the concave surfaces NUa and NBa of respective of the upper and lower nozzles NU and NB and jetted against the surfaces to be brought into contact with powder, namely, the lower end face 5*a* of the upper punch 5, the upper end face 6*a* of the lower punch 6 and the inner periphery of the die bore 41 before every powder compressing operation and hence can be attached to these surfaces substantially uniformly by electrostatic force. Thus, it is possible to prevent the occurrence of sticking reliably. Further, since powder lubricant L is jetted in a very small amount, which is a necessary and minimum amount for preventing the occurrence of sticking and can be attached to the target portions reliably, a tablet having a sufficient hardness can be prepared using powder unmixed with powder lubricant L.

Moreover, the provision of air curtain AC in the vicinity of the lower end of the upper punch 5 positioned in the powder lubricant jet section K and the provision of the bellows 5*n* make it possible to reliably prevent an excess of powder lubricant L that has leaked out of the box member BX of the powder lubricant jet section K from excessively attaching to the upper punch 5. What is more, the arrangement wherein a slight amount of powder lubricant L is jetted near the end faces of the upper and lower punches 5 and 6 while an excess of powder lubricant L collected by utilizing the air stream of air curtain AC, is capable of obviating the contamination problem while reliably preventing scattering of the excess of powder lubricant L. In addition, the compression molding machine is capable of keeping powder lubricant L attached to the lower end face 5*a* of the upper punch 5, the upper end face 6*a* of the lower punch 6 and the inner periphery of the die bore 41 and hence makes it possible to reduce the amount of consumption of powder lubricant L.

The present invention is not limited to the above-described embodiment.

The high voltages to be applied to respective of the first and second electrodes ED1 and ED2 may be varied to meet the properties of powder lubricant L to be used. Specifically, a lower voltage value is established as the particle diameter of powder lubricant L becomes smaller and, in reverse, a higher voltage value is established as the particle diameter of powder lubricant L becomes larger. By thus varying the voltage values of voltages to be applied to respective of the first and second electrodes ED1 and ED2 in accordance with the type of powder lubricant L to be used, electrostatic attachment of powder lubricant L can be made substantially even in amount irrespective of the type of powder lubricant L used. Needless to say, even in this case, the high voltage to be applied to the second electrode ED2 is set higher than the high voltage to be applied to the first electrode ED1.

Figure 11:
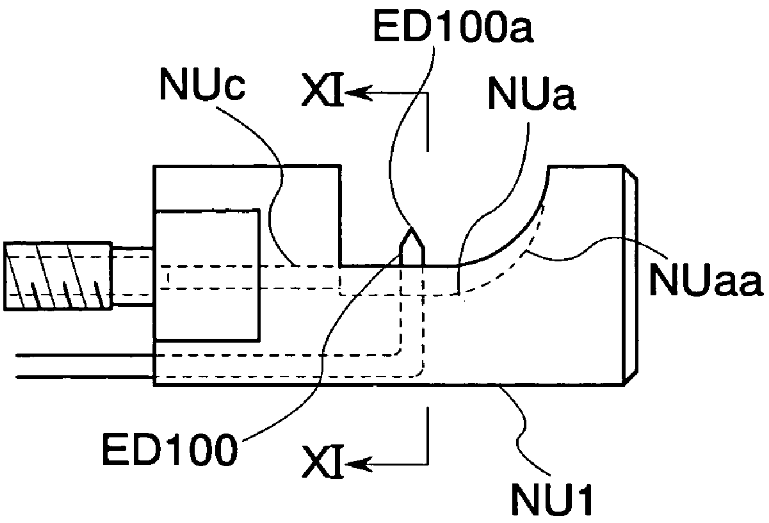
FIG. 11 is a side elevational view showing the tip of an upper (lower) nozzle for illustrating a variation of an electrode in the embodiment.
Figure 12:
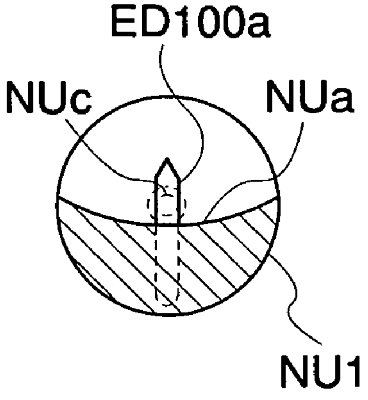
FIG. 12 is a sectional view taken along line XI-XI of FIG. 11.

An arrangement as shown in FIGS. 11 and 12 may be employed in which an electrode ED100 projects in the direction in which powder lubricant L is to be jetted from a substantially central portion of each of the concave surfaces NUa and NUb of the upper and lower nozzles NU and NB. In this case, the tip of the electrode ED100 may have the same shape as in the foregoing embodiment. The upper and lower nozzles NU and NB are shaped identical with each other except their concave surfaces oriented differently and, for this reason, description will be made of the upper nozzle NU illustrated. In the case of the upper nozzle NU, the electrode ED100 has a tip ED100*a* projects substantially perpendicularly to the bottom of the concave surface NUa in a direction away from the concave surface NUa, i.e., in an upward direction. Otherwise, the tip ED100*a* of the electrode ED100 projecting from the concave surface NUa may be tilted toward the inclined surface NUaa of the concave surface NUa.

While the foregoing embodiment is configured to compression-mold powder of a single type, the compression molding machine may be configured to mold either a nucleated tablet having a core compression-molded from powder of a different type or a product or the like having a through-hole extending centrally therethrough.

Additionally, each of the upper and lower punches may have an lower end face or upper end face formed with relief engraving or intaglio engraving corresponding to a mark, character or the like of a manufacturer in order to stamp the mark, character or the like on a product surface. Even with such punches, powder lubricant L can be attached to their respective surfaces requiring attachment of powder lubricant L by electrostatic force. Thus, powder lubricant L can be attached to the end faces of such punches as in the case of the upper and lower punches having no relieve engraving or the like. In this case, powder lubricant L can be substantially uniformly attached to a surface extending substantially parallel with the central axis of a punch having relief engraving as well as a surface extending transversely of the central axis.

Figure 13:
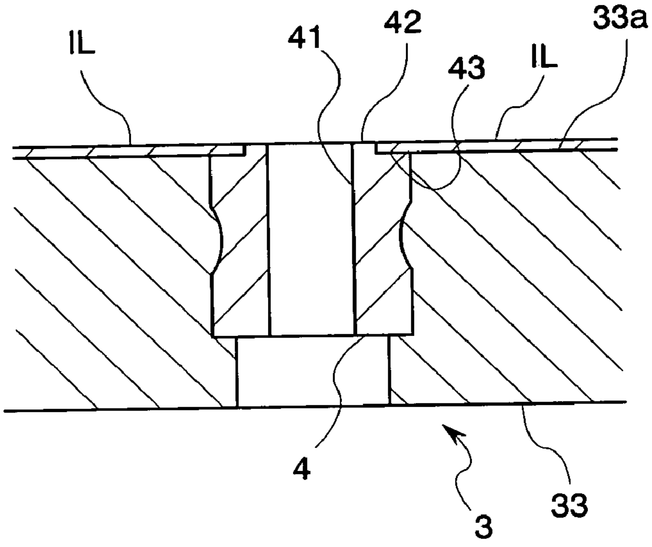
FIG. 13 is an enlarged sectional view showing a portion of interest of a turret according to another embodiment.

Another embodiment of the present invention will be described with reference to FIG. 13. This embodiment is similar to the foregoing embodiment in the basic structure and the characteristic arrangement for electrostatically charging powder lubricant L. For this reason, like reference characters are used to designate like or corresponding parts throughout these embodiments in order to omit description of such like or corresponding parts.

As powder lubricant L is jetted continuously as in the foregoing embodiment, a small amount of powder lubricant L may remain on the upper surface of the die section 33 of the turret 3 to describe a ring having a width equal to the diameter of the feed hole BX8*a*. For further reduction in the amount of such residual powder lubricant L, the upper surface of the die section 33 of the turret 3 is simply formed with an insulating layer IL to block powder lubricant L attracted toward the turret 3 as well as to destaticize residual powder lubricant to allow collection thereof. The following description will be directed to a specific example of such an arrangement.

Since the turret 3 is bodily formed from a metal such as stainless steel, the upper surface 33*a* of the die section 33 is coated with the insulating layer IL comprising an insulating material such as a ceramic material for example to inhibit attachment of powder lubricant L. Thus, this arrangement inhibits powder lubricant L from attaching to the upper surface 33*a* of the die section 33 of the turret 3 when powder lubricant L is continuously jetted against the upper surface 33*a* of the die section 33 of the turret 3 including dies 4. The insulating layer IL covering the upper surface 33*a* of the die section 33 may be formed by coating the upper surface 33*a* with, for example, a fluororesin instead of the ceramic material.

Similarly, the upper surface of each die 4 is coated with insulating layer IL comprising a ceramic material. This insulating layer IL may be formed either integrally with the insulating layer IL covering the die section 33 or separately for individual dies 4. To allow the insulating layer IL to be formed on the upper surface of each die 4, an exposed metal portion 42 is formed on an upper surface of each die 4 around the die bore 41 to provide a ring-shaped region having a predetermined width in which metal is exposed, whereby a ring-shaped step portion 43 is defined. The depth of the step portion 43 is substantially equal to the thickness of the insulating layer IL. Accordingly, the upper surface of the insulating layer IL is substantially flush with the upper surface of the exposed metal portion 42. The provision of the exposed metal portion 42 allows electrostatically charged powder lubricant L to be attracted toward the die bore 41 easily. The insulating layer IL covering the upper surface of each die 4 may comprise a fluororesin for example.

The provision of insulating layer IL covering the upper surface of the turret 3 and the upper surface of each die 4 substantially entirely makes it possible to minimize the amount of a residual excess of powder lubricant L on the turret 3. Further, the ring-shaped exposed metal portion 42, which lies on the upper surface of each die 4 around the die bore 41, enables powder lubricant L to be attached to the die bore 41 efficiently notwithstanding the presence of the insulating layer IL on the upper surface of each die 4.

Figure 14:
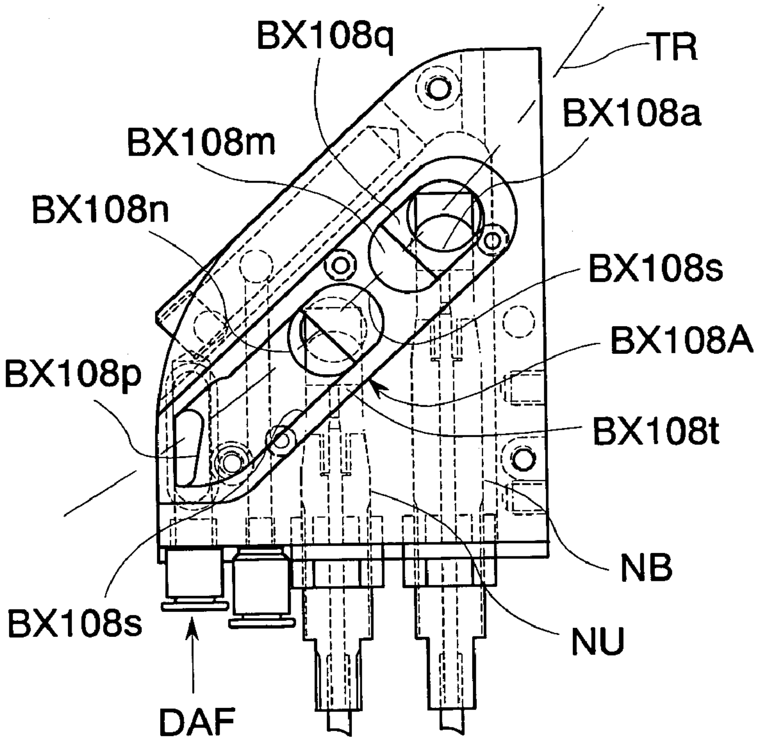
FIG. 14 is a bottom plan view showing a portion of interest of a powder lubricant jet section according to another embodiment.
Figure 15:
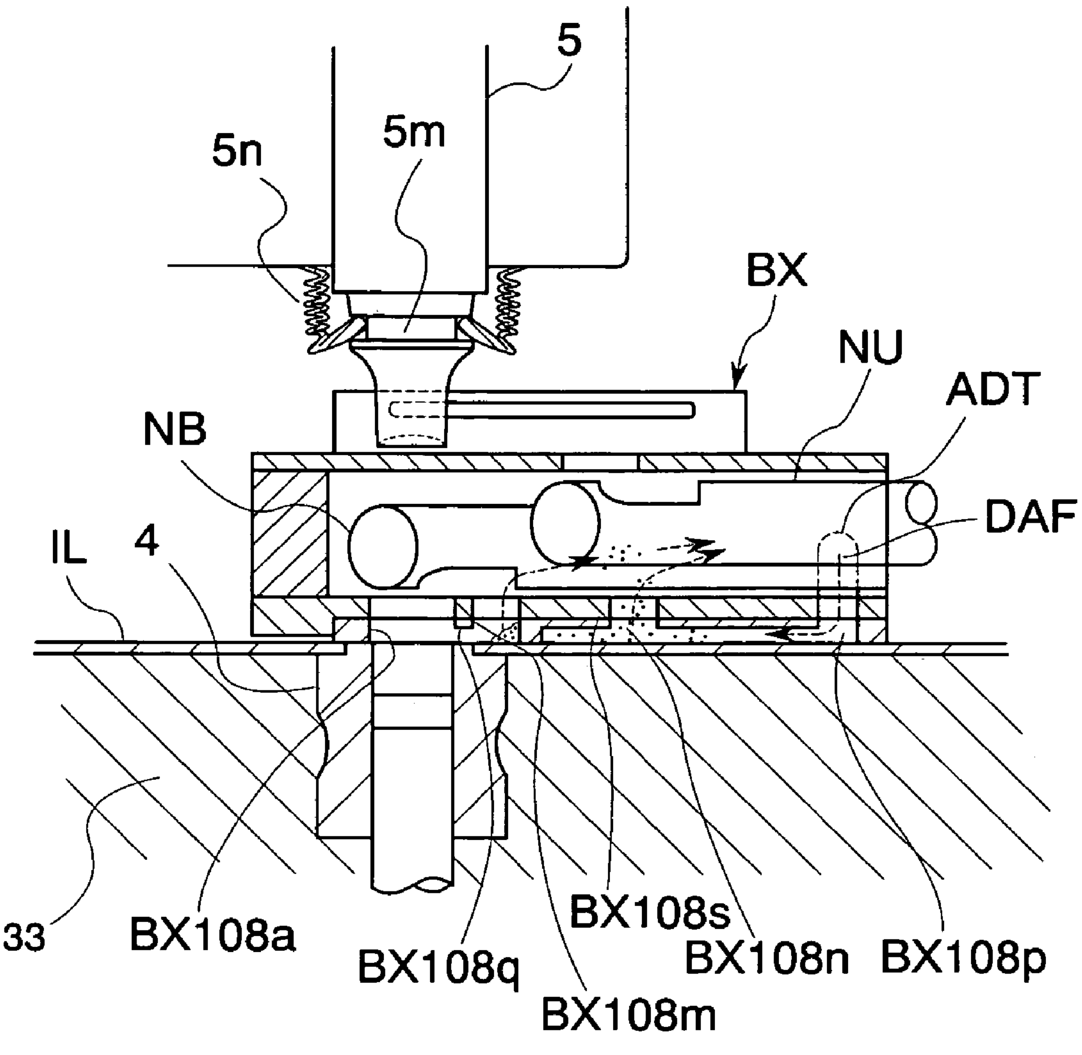
FIG. 15 is a sectional view showing a portion of interest of a powder lubricant jet section according to another embodiment.

In the above-described embodiment, the bottom plate BX8 of the box member BX in the powder lubricant jet section K has its underside entirely brought into a constant contact with the upper surface 33*a* of the turret 3. To improve the durability of contact portions, the bottom plate BX8 may be shaped so that only that portion thereof which corresponds to the track TR of the die 4 is brought into contact with the upper surface 33*a* of the turret 3. Hereinafter, a variation of the underside shape of the bottom plate BX8 of the box member BX will be described with reference to FIGS. 14 and 15.

The box member BX according this variation has a bottom plate BX108 having on its underside a portion corresponding to the track TR of the die 4 which projects downwardly from the rest. Specifically, the bottom plate BX108 of the box member BX is formed with a removable projecting portion BX108A for contact with the upper surface 33*a* of the turret 3. Other underside portion surrounding the projecting portion BX108A is on a higher level than the projecting portion BX108A so as not to contact the upper surface 33*a* of the turret 3. The projecting portion BX108A has a feed hole BX108*a* at a location coinciding with the lower nozzle NB in the box member BX for allowing powder lubricant L to pass therethrough while defining first and second suction holes BX108*m* and BX108*n* for sucking residual powder lubricant L remaining on the track of the die 4 on the upper surface 33*a* of the turret 3 into the box member BX and an air delivery hole BX108*p*. In the following description, the side on which the die 4 travels toward the projecting portion BX108A and the side on which the die 4 travels away from the projecting portion BX108A will be referred to as upstream side and downstream side, respectively.

The feed hole BX108*a* is located at an end portion of the projecting portion BX108A on the upstream side. On the downstream side of the feed hole BX108*a*, a first reduced thickness portion BX108*q* is formed continuously with the feed hole BX108*a*. On the downstream side of the first reduced thickness portion BX108*q*, there is provided the first suction hole 108*m* in communication with the inside of the box member BX, the first suction hole 108*m* being shaped semicircular in plan view and continuous with the first reduced thickness portion BX108*q*. On the downstream side of the first suction hole BX108*m*, there is provided a second reduced thickness portion BX108*s* via an intervening portion contacting the upper surface 33*a* of the turret 3. On the downstream side of the second reduced thickness portion BX108*s*, there is provided the second suction hole 108*n* in communication with the inside of the box member BX, the second suction hole 108*n* being shaped semicircular in plan view. At an end portion of the second reduced thickness portion BX108*s* on the downstream side, there is provided the air delivery hole BX108*p* for delivering a destaticizing air flow DAF to the upper surface 33*a* of the turret 3 through the box member BX. A contact bottom surface BX108*t* extends to surround the feed hole BX108$a$, the first and second reduced thickness portions BX108$q$ and BX108$s$, and the air delivery hole BX108$p$.

The destaticizing air flow DAF is an air flow charged opposite in polarity to charged powder lubricant L and serves to electrically neutralize or destaticizing residual charged powder lubricant L on the upper surface 33$a$ of the turret 3 by contacting the residual powder lubricant L. The destaticizing air flow DAT is generated by passing air through an electric field produced by an electrode charged opposite in polarity to powder lubricant L. The destaticizing air flow DAT is guided from a non-illustrated destaticizing air flow generator into the box member BX through a pipeline, passed through an air path ADT defined within the box member BX, and then delivered from the air delivery hole BX108$p$.

Since only the substantially ring-shaped contact bottom surface BX108$t$ of the aforementioned projecting portion BX108A is brought into contact with the turret 3, the turret 3 and the box member BX can enjoy improved durability. Further, the provision of the first and second suction holes BX108$m$ and BX108$n$ and the air delivery hole BX108$p$ makes it possible to collect residual powder lubricant remaining around each die 104 of the turret 3 into the box member BX efficiently. Specifically, first, the intervening portion between the first suction hole BX108$m$ and the second reduced thickness portion BX108$s$ contacts the upper surface 33$a$ of the turret 3 to scrape together residual powder lubricant L remaining on the upper surface 33$a$ of the turret 3, and the residual powder lubricant L thus gathered is sucked into the first suction hole BX108$m$.

On the other hand, the space defined by the second reduced thickness portion BX108$s$ becomes filled with residual powder lubricant L that is destaticized and stirred up from the upper surface 33$a$ of the turret 3 by contact with the destaticizing air flow DAF jetted from the air delivery hole BX108$p$. Since the second reduced thickness portion BX108$s$ is surrounded by the contact bottom surface BX108$t$, powder lubricant L thus stirred up is sucked into the box member BX through the second suction hole BX108$n$ without scattering outside. Thus, it is possible to collect substantially the whole of residual powder lubricant L remaining on the upper surface 33$a$ of the turret 3 except powder lubricant L attached to the die bore 141.

Figure 16:
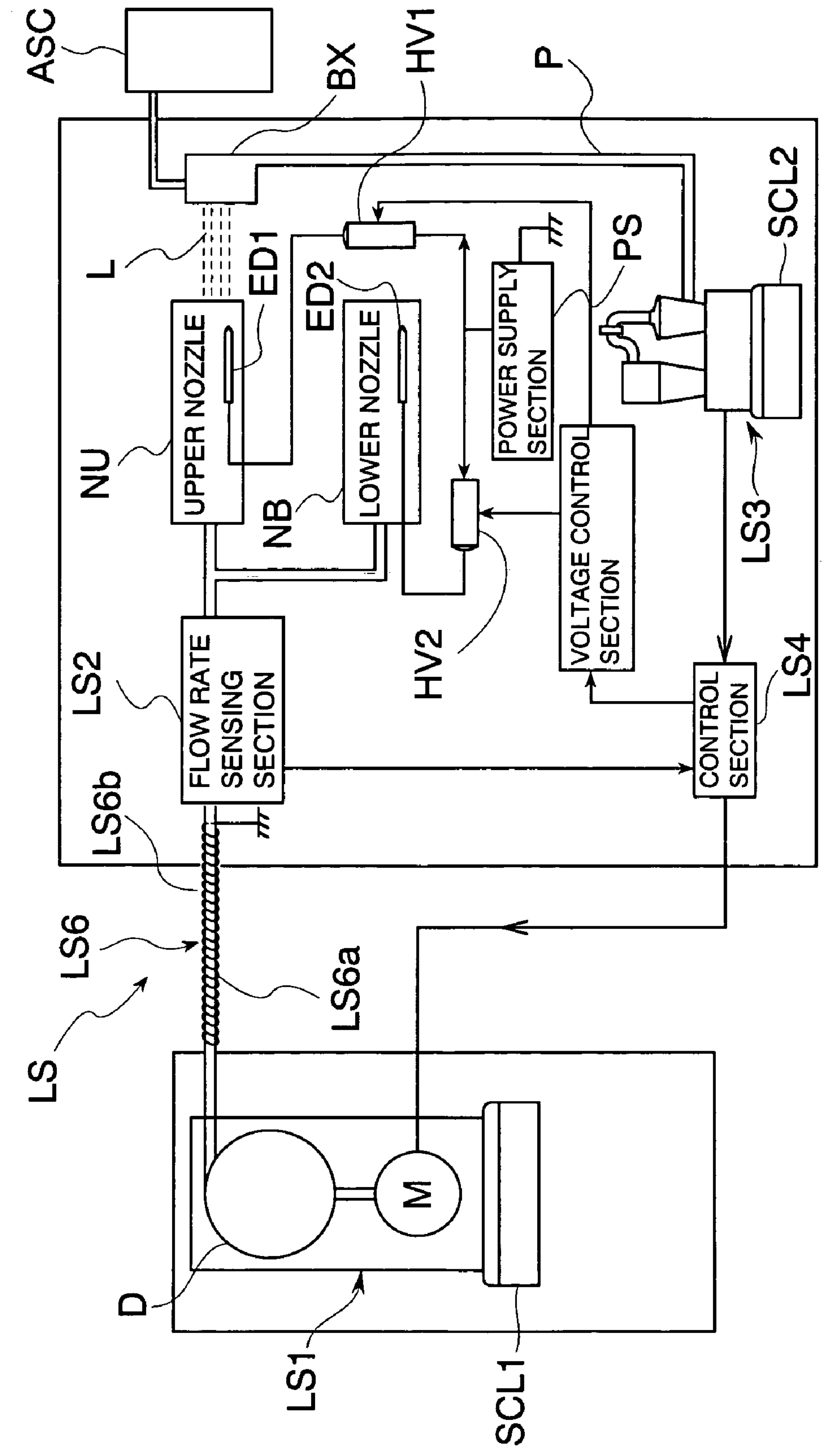
FIG. 16 is a block diagram schematically showing the configuration of a powder lubricant feeder device according to another embodiment.
Figure 17:
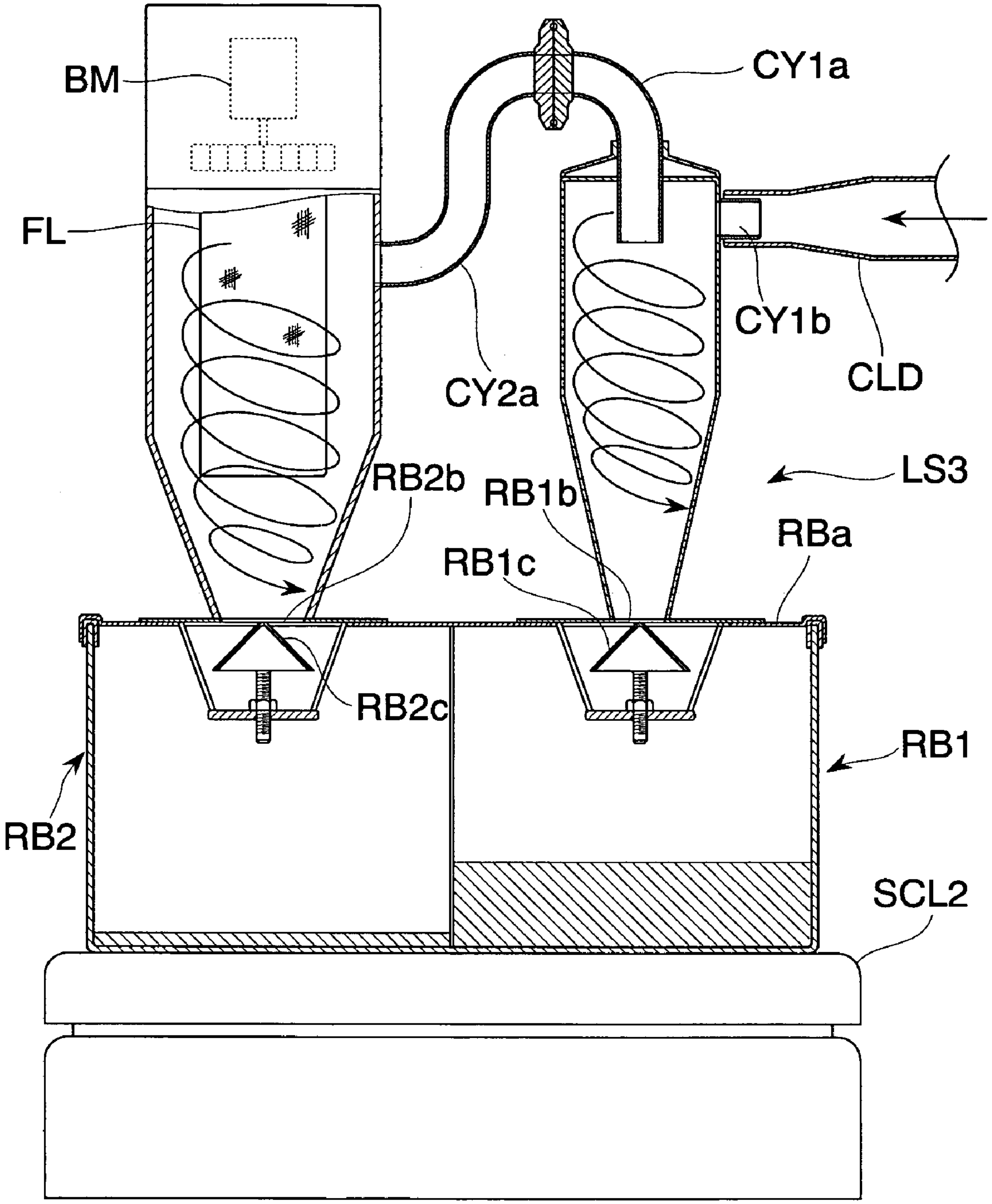
FIG. 17 is an enlarged sectional view schematically showing a collected amount sensing section according to another embodiment.

An amount of powder lubricant L can be measured using the aforementioned optical flow rate sensor or a scales. Specifically, such a scales may include electronic balances (hereinafter will be referred to as balance(s) simply) SCL1 and SCL2. With reference to FIGS. 16 and 17, description will be made of an embodiment using the balances SCL1 and SCL2. This embodiment may not be provided with the aforementioned optical flow rate sensing section LS2. If the optical flow rate sensing section LS2 is provided, passage of powder lubricant L may be simply detected based on signals outputted from the flow rate sensing section LS2. That is, it is possible that this embodiment uses the flow rate sensing section LS2 not to sense a flow rate of powder lubricant L but to detect a failure of the powder lubricant jet device LS such as a failure to feed powder lubricant L.

Weighing of powder lubricant L is performed by the feeding-side balance SCL1 configured to measure the weight of the powder lubricant feed section LS1 and the collection-side balance SCL2 configured to measure the weight of the collected amount sensing section LS3 for measuring the weight of powder lubricant L collected.

The powder lubricant feed section LS1 is bodily placed on the feeding-side balance SCL1, and the scale of the balance SCL1 is adjusted with the bare weight of the powder lubricant feed section LS1 used as a tare weight. In this case, the powder lubricant feed section LS1 and the feed pipeline LS6 are connected to each other in a floating state so that the powder lubricant feed section LS1 fails to receive any external force via the feed pipeline LS6. Specifically, the powder lubricant feed section LS1 and the feed pipeline LS6 are connected to each other with a slight clearance therebetween. Even when the feed pipeline LS6 is vibrated or deflected by some reason, this structure blocks an external force resulting from such a phenomenon at the clearance and hence does not allow the external force to be transferred to the powder lubricant feed section LS1. Because the feed pipeline LS6 is connected to the outer periphery of an output pipe of the powder lubricant feed section LS1, it is impossible that outgoing powder lubricant L leaks through the clearance. Such a structure is capable of preventing the tare weight on the feeding-side balance SCL 1 from varying by any factor other than the powder lubricant feed section LS1.

On the other hand, the collected amount sensing section LS3 comprises a first cyclone CY1, a second cyclone CY2 connected to the first cyclone CY1, a first collection container RB1 for containing powder lubricant L collected by the first cyclone CY1, and a second collection container RB2 for containing powder of smaller particle diameter including powder lubricant L collected by the second cyclone CY2. This collected amount sensing section LS3 is placed on the collection-side balance SCL2.

The first and second cyclones CY1 and CY2 communicate with each other through a flanged connector pipe CY1$a$ mounted on top of the first cyclone CY1 and a joint connector pipe CY2$a$ mounted on an upper lateral portion of the second cyclone CY2 and joined to the flanged connector pipe CY1$a$. The first cyclone CY1 is provided at its upper lateral portion with an external connector pipe CY1$b$, to which a collection pipe CLD communicating with the box member BX of the powder lubricant jet section K is connected not tightly but in a floating state to define a clearance therebetween.

On the other hand, lower portions of respective of the first and second cyclones CY1 and CY2 are joined to the first collection container RB1 and the second collection container RB2, respectively. The first and second collection containers RB1 and RB2 each comprise a rectangular parallelepiped box and are formed integral with each other. The first and second collection containers RB1 and RB2 are fitted with a removable common lid member RBa covering the upper side thereof. The lid member RBa defines openings RB1$b$ and RB2$b$ to which the lower portions of the first and second cyclones CY1 and CY2 are fixed respectively. Conical baffles RB1$c$ and RB2$c$ are disposed under the respective openings RB1$b$ and RB2$b$ so as to be opposed to the lower ends of the first and second cyclones CY1 and CY2. The baffles RB1$c$ and RB2$c$ serve to prevent powder lubricant L colleted into the first and second collection containers RB1 and RB2 from being drawn back toward the first and second cyclones CY1 and CY2. The baffles RB1$c$ and RB2$c$ are mounted so as to be adjustable in their respective height levels.

The second cyclone CY2 has a blower motor BM equipped with a turbo fan in an upper portion thereof, and a cylindrical filter FL located below the blower motor BM. The second cyclone CY2 communicates at its upper lateral portion with the first cyclone CY1. The second cyclone CY2 serves to collect powder lubricant L having relatively small particle diameters which the first cyclone CY1 has not been able to collect. When the blower motor BM operates, an air flow ascending from below the filter FL is generated, which causes a downwardly swirling air flow to be generated around the outer periphery of the filter FL.

In the collected amount sensing section LS3, the blower motor BM incorporated in the second cyclone CY2 operates to collect powder lubricant L into the first and second collection containers RB1 and RB2 of the integral structure through the box member BX of the powder lubricant jet section K and the collection pipe CLD.

Most of powder lubricant L collected, for example, about 90% to about 95% of the amount of collected powder lubricant L, is collected into the first collection container RB1 by the first cyclone CY1. The rest of powder lubricant L which has relatively small particle diameters and which has not been collected by the first cyclone CY1 is collected into the second collection container RB2 by the second cyclone CY2. In the second cyclone CY2, powder lubricant L is brought into contact with the outer surface of the filter FL and the downwardly swirling air flow acts to collect such powder lubricant L into the second collection container RB2.

Since the first cyclone CY1 and the collection pipe CLD are connected to each other with a slight clearance intervening therebetween, any external force is not exerted on the first cyclone CY1 during the collecting operation. That is, the collection pipe CLD fails to be attracted and attached to the collected amount sensing section LS3 placed on the collection-side balance SCL2 by the force of suction that is produced in each of the first and second cyclones CY1 and CY2 when the blower motor BM of the second cyclone CY is operated. Accordingly, the collected amount sensing section LS3 cannot be weighed lighter due to unintended support by the collection pipe CLD, thus preventing the tare weight from varying.

With such an arrangement, the control section LS4 calculates the amount of powder lubricant L used by subtracting the weight of actually collected powder lubricant L that is measured by the collection-side balance SCL2 from the weight of powder lubricant L that is measured by the feeding-side balance SCL1. Since the collection-side balance SCL2 indicates the total weight of the collected amount sensing section LS3 and collected powder lubricant L, the weight of actually collected powder lubricant L is determined by subtracting the weight of the collected amount sensing section LS3 as the tare weight from the weight indicated by the collection-side balance SCL2. Measurement of the amount of powder lubricant L used is conducted at predetermined time intervals. The control section LS4 compares the measured amount of powder lubricant L used with an established value preset in accordance with the powder compression molding speed. If the amount used is larger than the established value, the control section LS4 controls the powder lubricant feed section LS1 to reduce the feed rate of powder lubricant L. If the amount used is smaller than the established value to the contrary, the control section LS4 controls the powder lubricant feed section LS1 to increase the feed rate of powder lubricant L.

By thus using the feeding-side balance SCL1 and the collection-side balance SCL2, it is possible to measure the amount of powder lubricant L used accurately. As a result, the first and second d.c. high voltages to be applied to respective of the first and second electrodes ED1 and ED2 of the upper and lower nozzles NU and NB can be feedback-controlled precisely, thereby allowing powder lubricant L to be attached to the target portions efficiently. Thus, the occurrence of sticking and contamination can be prevented.

It should be noted that the structures and features of the components of the powder compression molding machine are not limited to the examples illustrated in the drawings but may be changed or modified variously without departing from the spirit of the present invention.

As described above, the present invention is configured to allow powder lubricant L to be efficiently attached to desired portions including at least the lower end face 5*a* of the upper punch 5, the upper end face 6*a* of the lower punch 6 and the die bore 41 of the die 4 by electrostatically charging powder lubricant L upon jetting. However, if variations occur in the amount of powder lubricant L attached, the present invention may have an additional arrangement for performing control over the amount of powder lubricant L to be jetted. In this case, the weight of the powder lubricant jet device LS is measured to find the feed rate of powder lubricant L fed to the upper and lower nozzles NU and NB from the powder lubricant jet device LS, and then the feed rate of powder lubricant L is controlled so that the feed rate thus found becomes equal to a target value. By thus controlling the feed rate of powder lubricant L based on the measured weight of the powder lubricant jet device LS, it is possible to avoid the influence exerted by powder lubricant transport paths from the powder lubricant jet device LS to the upper and lower nozzles NU and NB. Accordingly, the feed rate of powder lubricant L can be controlled more precisely.

INDUSTRIAL APPLICABILITY

As described above, the rotary powder compression molding machine according to the present invention, which is configured to allow powder lubricant to be attached to punches and dies, is capable of reliably improving the powder lubricant attaching efficiency while substantially completely preventing powder lubricant to be mixed into powder to be compression-molded. Thus, the rotary powder compression molding machine can find use in preparing tablets, foods and the like.

The invention claimed is:

1. A rotary powder compression molding machine, comprising:

a turret which is rotatably mounted in a frame via a vertical shaft;

dies, each having a die bore, which are mounted on the turret;

an upper punch and a lower punch which are vertically slidably held above and below each of the dies, tips of the upper and lower punches being insertable in the die bore, the upper and lower punches being pressable and movable toward each other to compression-mold powder filled in the die bore between a lower end face of the upper punch and an upper end face of the lower punch, and powder lubricant jet means for jetting powder lubricant against the end faces of respective of the upper and lower punches and against the die bore prior to filling of the powder into the die bore, the powder lubricant jet means including a first jet nozzle configured to jet the powder lubricant placed at a powder lubricant jet position substantially toward the end face of the upper punch;

a second jet nozzle configured to jet the powder lubricant placed at a powder lubricant jet position substantially toward the end face of the lower punch; and a charger device including first and second electrodes for producing first and second electric fields, respectively, through which the powder lubricant to be jetted from the first jet nozzle and the powder lubricant to be jetted from the second jet nozzle pass respectively, the charger device being capable of rendering the powder lubricant to be jetted against each of the lower punch and the die different from the powder lubricant to be jetted against the upper punch in electrostatically charged condition, wherein the charger device comprises first voltage application means for applying a first voltage to the first electrode, and second voltage application means for applying a second voltage to the second electrode, the second voltage being higher than the first voltage.

2. The rotary powder compression molding machine according to claim 1, further comprising a powder lubricant jet device configured to pressure-feed the powder lubricant to the powder lubricant jet means, wherein the powder lubricant jet device and the powder lubricant jet means being in communication with each other via a feed pipeline from which influence of static electricity is eliminated.

3. The rotary powder compression molding machine according to claim 2, wherein the feed pipeline comprises an inner pipe formed from an insulating material for allowing the powder lubricant to pass therethrough, and an electrically conductive member for inhibiting the inner pipe from being electrostatically charged, the electrically conductive member being grounded.

4. The rotary powder compression molding machine according to claim 1, which is provided with an air delivery hole for feeding a destaticizing air flow to the upper surface of the turret to destaticize residual powder lubricant on the upper surface of the die, and a suction hole for sucking in the residual powder lubricant destaticized.

5. The rotary powder compression molding machine according to claim 1, further comprising an air stream providing mechanism configured to jet air to adjacent the lower end face of the upper punch for preventing the powder lubricant jetted from the first jet nozzle from scattering upwardly, wherein the powder lubricant jet means further comprises a powder sucking mechanism configured to suck in the powder lubricant that is prevented from moving upwardly by the air stream providing mechanism.

6. A rotary powder compression molding machine, comprising:

a turret which is rotatably mounted in a frame via a vertical shaft;

dies, each having a die bore, which are mounted on the turret;

an upper punch and a lower punch which are vertically slidably held above and below each of the dies, tips of the upper and lower punches being insertable in the die bore, the upper and lower punches being pressable and movable toward each other to compression-mold powder filled in the die bore between a lower end face of the upper punch and an upper end face of the lower punch, and powder lubricant jet means for jetting powder lubricant against the end faces of respective of the upper and lower punches and against the die bore prior to filling of the powder into the die bore, the powder lubricant jet means including a first jet nozzle configured to jet the powder lubricant placed at a powder lubricant jet position substantially toward the end face of the upper punch;

a second jet nozzle configured to jet the powder lubricant placed at a powder lubricant jet position substantially toward the end face of the lower punch; and a charger device including first and second electrodes for producing first and second electric fields, respectively, through which the powder lubricant to be jetted from the first jet nozzle and the powder lubricant to be jetted from the second jet nozzle pass respectively, the charger device being capable of rendering the powder lubricant to be jetted against each of the lower punch and the die different from the powder lubricant to be jetted against the upper punch in electrostatically charged condition, wherein the charger device comprises first voltage application means for applying a first voltage to the first electrode, and second voltage application means for applying a second voltage to the second electrode, the second voltage being higher than the first voltage, and wherein the first and second jet nozzles each have a concave surface facing the end face of a respective one of the punches for guiding the powder lubricant before jetting, the concave surface of the first jet nozzle defining a space for the first electric field to be produced therein, the concave surface of the second jet nozzle defining a space for the second electric field to be produced therein.

7. The rotary powder compression molding machine according to claim 6, further comprising a powder lubricant jet device configured to pressure-feed the powder lubricant to the powder lubricant jet means, wherein the powder lubricant jet device and the powder lubricant jet means being in communication with each other via a feed pipeline from which influence of static electricity is eliminated.

8. The rotary powder compression molding machine according to claim 6, which is provided with an air delivery hole for feeding a destaticizing air flow to the upper surface of the turret to destaticize residual powder lubricant on the upper surface of the die, and a suction hole for sucking in the residual powder lubricant destaticized.

9. The rotary powder compression molding machine according to claim 8, wherein the powder lubricant jet means further comprises a box member enclosing the powder lubricant jet position, wherein: the concave surfaces of respective of the first and second jet nozzles are located within the box member; and the powder sucking mechanism sucks in an excess of the powder lubricant scattering from the box member through the box member in cooperation with the air stream provided by the air stream providing mechanism.

10. The rotary powder compression molding machine according to claim 6, further comprising an air stream providing mechanism configured to jet air to adjacent the lower end face of the upper punch for preventing the powder lubricant jetted from the first jet nozzle from scattering upwardly, wherein the powder lubricant jet means further comprises a powder sucking mechanism configured to suck in the powder lubricant that is prevented from moving upwardly by the air stream providing mechanism.

11. The rotary powder compression molding machine according to claim 6, wherein the concave surface of each of the jet nozzles is shaped into a three-dimensional curved surface.

12. The rotary powder compression molding machine according to claim 10, wherein the powder lubricant jet means further comprises a box member enclosing the powder lubricant jet position, wherein: the concave surfaces of respective of the first and second jet nozzles are located within the box member; and the powder sucking mechanism sucks in an excess of the powder lubricant scattering from the box member through the box member in cooperation with the air stream provided by the air stream providing mechanism.

* * * * *